United States Patent
Jalali

(10) Patent No.: US 10,644,784 B2
(45) Date of Patent: May 5, 2020

(54) COMMUNICATIONS SYSTEM FOR PROVIDING BROADBAND ACCESS TO AERIAL PLATFORMS

(71) Applicant: Ahmad Jalali, Rancho Santa Fe, CA (US)

(72) Inventor: Ahmad Jalali, Rancho Santa Fe, CA (US)

(*) Notice: Subject to any disclaimer, the term of this patent is extended or adjusted under 35 U.S.C. 154(b) by 213 days.

(21) Appl. No.: 15/897,018

(22) Filed: Feb. 14, 2018

(65) Prior Publication Data
US 2018/0241461 A1  Aug. 23, 2018

Related U.S. Application Data

(60) Provisional application No. 62/460,476, filed on Feb. 17, 2017, provisional application No. 62/465,955, filed on Mar. 2, 2017, provisional application No. 62/480,485, filed on Apr. 2, 2017.

(51) Int. Cl.
| | |
|---|---|
| *H04B 7/185* | (2006.01) |
| *H04B 7/212* | (2006.01) |
| *H04W 52/42* | (2009.01) |
| *H04W 52/24* | (2009.01) |
| *H04B 17/336* | (2015.01) |

(52) U.S. Cl.
CPC ......... *H04B 7/18502* (2013.01); *H04B 7/212* (2013.01); *H04W 52/24* (2013.01); *H04W 52/42* (2013.01); *H04B 17/336* (2015.01); *H04W 52/242* (2013.01); *H04W 52/243* (2013.01)

(58) Field of Classification Search
CPC .. H04B 7/18502; H04B 7/212; H04B 7/0617; H04B 17/309; H04B 17/336; H04W 16/28; H04W 52/24; H04W 52/42; H04W 52/242; H04W 52/243
See application file for complete search history.

(56) References Cited

U.S. PATENT DOCUMENTS

| | | | | |
|---|---|---|---|---|
| 5,307,507 A | * | 4/1994 | Kanai | H04W 16/02 455/447 |
| 5,566,355 A | | 10/1996 | Kanai | |
| 9,578,580 B1 | * | 2/2017 | Ishfaq | H04W 36/30 |
| 2004/0106412 A1 | | 6/2004 | Laroia | |
| 2004/0196800 A1 | * | 10/2004 | Padovani | H04W 16/02 370/321 |
| 2006/0030311 A1 | * | 2/2006 | Cruz | H01Q 1/246 455/431 |
| 2006/0068848 A1 | | 3/2006 | Shapira | |
| 2006/0223538 A1 | * | 10/2006 | Haseba | H04W 36/18 455/436 |
| 2010/0008311 A1 | | 1/2010 | Oh | |
| 2015/0236778 A1 | | 8/2015 | Jalali | |

(Continued)

*Primary Examiner* — Kibrom T Hailu

(57) ABSTRACT

A terrestrial communications network for providing broadband internet access to aerial platforms is described. One set of embodiments describe assignment of cell site beams to aerial platforms to maximize signal quality in a frequency reuse of 1 network. Another set of embodiments describe time division duplexing and beam forming schemes for minimizing co-channel interference. Systems and methods for establishing links from aerial platforms to cell sites, and mobility management of aerial platforms, to maximize signal quality are described. In another set of embodiments, systems and methods are described to mitigate fading due to ground reflection.

20 Claims, 16 Drawing Sheets

(56) References Cited

U.S. PATENT DOCUMENTS

| | | | |
|---|---|---|---|
| 2015/0236779 A1 | 8/2015 | Jalali | |
| 2015/0236780 A1* | 8/2015 | Jalali | H04W 84/06 455/13.4 |
| 2015/0280806 A1* | 10/2015 | Jalali | H04W 40/22 370/316 |
| 2015/0280812 A1* | 10/2015 | Jalali | H04W 40/22 455/431 |
| 2016/0105233 A1 | 4/2016 | Jalali | |
| 2016/0112116 A1* | 4/2016 | Jalali | H04W 16/28 370/252 |
| 2017/0126304 A1* | 5/2017 | Black | H04B 7/0413 |
| 2018/0005535 A1* | 1/2018 | Kalathil | B64C 39/024 |
| 2018/0006371 A1 | 1/2018 | Dang | |
| 2018/0019789 A1 | 1/2018 | Hyslop | |
| 2018/0083692 A1 | 3/2018 | Miranda | |
| 2018/0097560 A1 | 4/2018 | Jalali | |
| 2018/0146419 A1 | 5/2018 | Raghavan | |

* cited by examiner

COMMUNICATIONS SYSTEM FOR PROVIDING BROADBAND ACCESS TO AERIAL PLATFORMS

CROSS-REFERENCE

This application claims priority to U.S. Provisional Patent Application No. 62/460,476 entitled: "A COMMUNICATIONS SYSTEM FOR PROVIDING BROADBAND ACCESS TO AERIAL PLATFORMS" filed Feb. 17, 2017, U.S. Provisional Application Ser. No. 62/465,955 filed Mar. 2, 2017, and U.S. Provisional Application Ser. No. 62/480,485 filed April 2 the contents of which are incorporated by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present disclosure describes aspects of a system comprising of a network of terrestrial cell sites for broadband internet access to aerial platforms such as drones, general aviation, and commercial aircraft. The present disclosure describes systems and methods for the design and pointing of the terrestrial cell site antenna beams toward the aerial platforms, design and pointing of the aerial platform antenna beams toward the cell sites, scheduling of aerial platforms to receive/transmit data from/to the cell sites, radio resource assignment, and mobility management of aerial platform data links to the cell sites.

BACKGROUND OF THE INVENTION

Broadband internet access to aerial platforms such as low altitude drones flying at an altitude of about 400 feet, and general aviation and commercial aircraft flying at altitudes of as high as 50,000 feet, has in recent years been of great interest. Two different approaches to providing broadband internet access to aircraft have been: a network of ground cell sites referred to as ATG (Air to Ground); satellite based aeronautical broadband access systems.

Communications systems using GSOs (Geo-Stationary Satellites) can provide ubiquitous internet access to aircraft over land as well as water. However, satellite-based systems are expensive means of providing broadband access to aircraft. ATG systems are a less expensive means of providing broadband access for aircraft flying over land. To provide ubiquitous and cost efficient broadband access to aircraft over land and oceans, a hybrid system consisting of a cost efficient ATG system for coverage over land, combined with a satellite-based system for coverage over water, is one candidate solution.

A well-known ATG system is the network of cell sites that is deployed and operated by Gogo in the 800 MHz band, and covers the CONUS (Continental US). This system has access only to 4 MHz of spectrum; this small amount of spectrum limits the data rate to each aircraft and the overall network throughput. In order to provide a high data rate and high throughput ATG system, larger amount of spectrum is needed. However, it is also important that the spectrum be inexpensive. Licensed spectrum that is usable for broadband access to smartphones and other consumer devices is too expensive to be used for ATG systems. Therefore, an inexpensive source of spectrum is needed for ATG systems.

There is a large amount of spectrum in frequency bands above 3 GHz. One source of spectrum for ATG service is the 5 GHz unlicensed band, specifically the so called UNII-1 (5.15 to 5.25 GHz) and UNII-3 (5.725 to 5.85 GHz) bands. The obvious benefit of using the unlicensed bands is that they do not require any license fees. However, since the spectrum is being used by multiple systems, techniques must be devised to mitigate interference from other systems into the ATG system, while meeting the FCC imposed EIRP (Effective Isotropic Radiated Power) limits in the unlicensed bands. There are also other sources of spectrum above 5 GHz such as the C band, or even higher bands, where an ATG system may be able to share the spectrum with another service. Signal attenuation due to propagation path loss and other atmospheric effects are high in higher frequencies, and techniques are required to mitigate these effects. Moreover, the objective is to provide very high data rates to the aircraft, similar to the data rates to which people are accustomed at home. Therefore, system and methods are required to develop a high throughput system specifically optimized for aerial platforms.

BRIEF DESCRIPTION OF THE SEVERAL VIEWS OF THE DRAWINGS

Some embodiments of the present invention are illustrated as an example, and are not limited by the accompanying figures. In the following figures, where appropriate, similar components are identified using the same reference label.

SUMMARY

Figure 1:
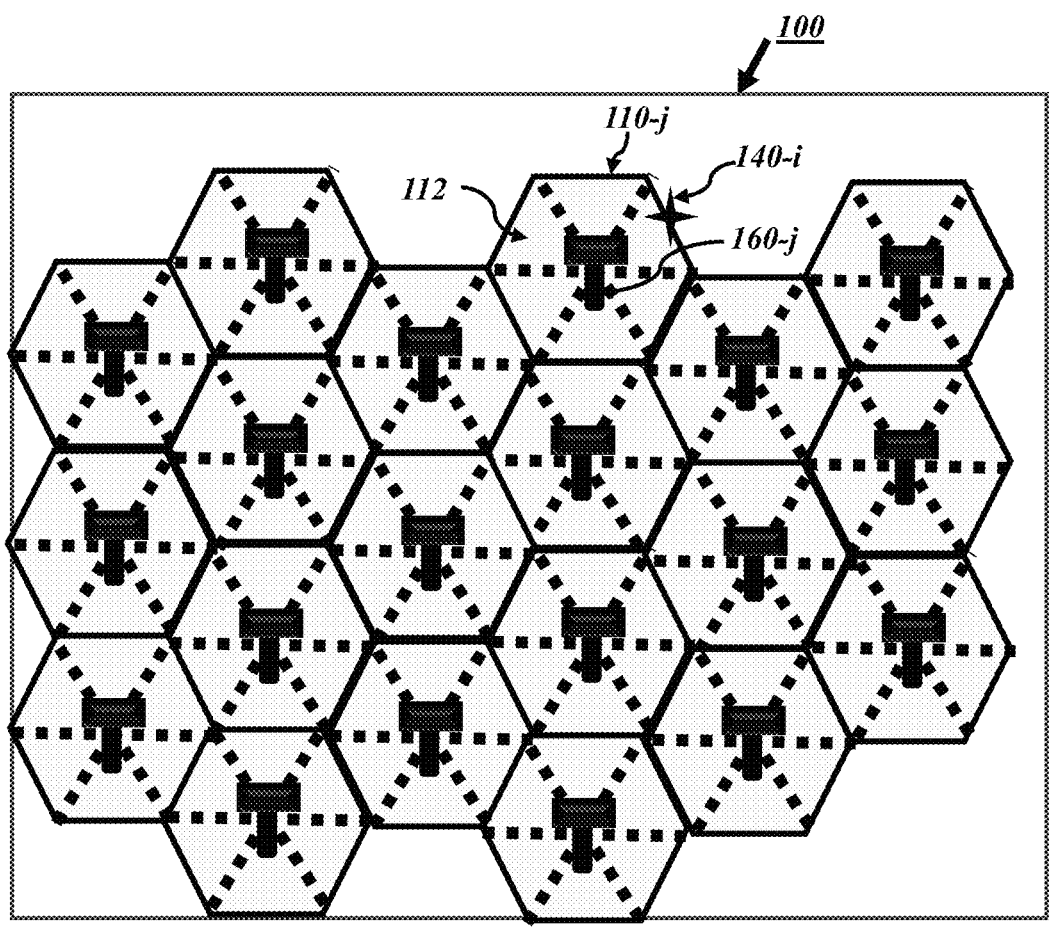
FIG. 1 illustrates an exemplary diagram of a network of cell sites for providing broadband internet access to aerial platforms of some embodiments.

A system to provide broadband access to aerial platforms is described, comprising: a network of cell sites comprising communications equipment, comprising a radio sub-system, and a sectorized antenna sub-system made of multiple antenna elements configured to form at least one directional beam; the cell site radio sub-system comprising of RF transceiver, baseband modem, beam former, and processor sub-systems; a plurality of aerial platforms that each comprise an aerial platform radio sub-system, and an aerial platform antenna sub-system comprising of at least one antenna aperture with steerable directional beam; the aerial platform radio sub-system comprising of RF transceiver, baseband modem, gyroscope/GPS, and processor sub-systems; a cell site controller connected to radio sub-systems of all cell sites, configured to manage handoff of aerial platforms among cell sites, and to assign cell site beams, frequency channels and time slots to aerial platforms; the cell site and aerial platform radio sub-systems utilizing a Time Division Duplex (TDD) multiplexing scheme whereby forward and reverse links use the same frequency channel but transmit in alternative time frames; and the aerial platform radio sub-system capable of measuring the received Signal to Interference plus Noise Ratio (SINR) of cell site reference signals on all aerial platform antenna apertures.

Systems and methods are described to maximize received SINR at the aerial platform receiver. In one embodiment, the aerial platform is assigned to communicate with the nearest cell site. In another embodiment, the areal platform is assigned to communicate with the cell site from which the aerial platform radio sub-system receives the highest measured SINR. In another embodiment, when measured SINR at the aerial platform radio sub-system on a given antenna aperture/beam falls below a threshold, the aerial platform radio sub-system searches for reference signals from other cell sites or on other aerial platform antenna aperture/beams, and if higher SINR is received from a different cell site, then the aerial platform radio sub-system hands off the call to the link between the aerial platform antenna aperture/beam and the cell site on which highest SINR is detected.

In one embodiment, the aerial platform comprises of at least three antenna apertures, and the aerial platform radio sub-system uses the aerial platform antenna aperture from which it receives the strongest SINR. In another embodiment, the aerial platform radio sub-system periodically switches the radio sub-system to a different aerial platform antenna aperture/beam and searches for reference signals from cell sites, and if higher signal quality is received from a different cell site or on a different aerial platform antenna aperture/beam, then handoff to the link between an aerial platform antenna aperture/beam and cell site with highest signal quality is initiated. In another embodiment, a mechanical device switches the azimuthal position of the aerial platform antenna apertures among a number of positions to more accurately point the antenna beam toward the cell site to receive stronger signal quality. In another embodiment, the aerial platform antenna comprises of a single antenna aperture, and a mechanical device rotates the antenna aperture toward the cell site with which the aerial platform is communicating, thereby increasing the received signal strength.

Systems and methods are described to minimize the impact of fading due to ground reflection. In one embodiment, the cell site sector antenna comprises of at least two antenna apertures, each antenna aperture placed vertically above another antenna, and the cell site radio sub-system receives from the antenna aperture on which it measures a stronger signal quality. In another embodiment, the cell site radio sub-system transmits to the aerial platform on the same antenna aperture on which it receives a stronger signal. In another embodiment, the cell site radio sub-system sequentially transmits a reference signal on each of the at least two antennas, the aerial platform radio sub-system measures the signal quality received from each of the cell site transmit antennas, the aerial platform radio sub-system informs the cell site radio sub-system on which cell site sector antenna it receives a higher signal quality, and the cell site radio sub-system transmits on the sector antenna on which the aerial platform receives the highest signal quality.

Systems and methods are described to minimize cross-beam interference at the aerial platform radio sub-system receiver. In one embodiment, the cell sites in each row of the cell sites in the network use TDD duplexing that is opposite to that of the adjacent rows of cell sites, such as to reduce the number of co-channel beams received at an aerial platform receiver, thereby reducing interference received at the aerial platform. In another embodiment, each cell site comprises of an even number of sectors, on a given frequency channel and time slot each cell site only transmits on even numbered or odd numbered sectors, and cell sites in adjacent columns of cell sites use alternating patterns of even sectors transmitting or odd sectors transmitting during a given time slot, thereby reducing interference received at the aerial platform receiver.

Methods are described for computing the SINR received at different receivers in the network, and using the computed SINRs to compute optimal network beam assignment according to different data rate optimization criteria. One method estimates the Signal to Interference plus Noise Ratio (SINR) received at the aerial platform radio sub-system, the method comprising: each aerial platform periodically sends to the cell site controller its position coordinates as well as the azimuthal and elevation orientation of the aerial platform antenna apertures with respect to each cell sites in the network; the cell site controller stores in memory the antenna patterns of the aerial platform and cell site antenna beams; the cell site controller estimates the received signal powers at the aerial platforms from all scheduled transmitting cell site beams, taking into account the cell site and aerial platform antenna patterns, position coordinates of the aerial platforms and the cell sites, aerial platform antenna aperture orientation with respect to the cell sites, and the transmit power of the cell sites beams; and the cell site controller computes the received SINR using the estimated received signal powers at the aerial platform radio sub-systems.

In one embodiment, using estimates of SINR at the aerial platform and the cell site receivers, cell site controller determines a cell site to aerial platform beam, frequency channel and time slot assignment that optimizes the network throughput, comprising: assigning a set of aerial platforms in active state to candidate cell site beams on the same frequency channel and time slot; computing the SINR at the receivers of the aerial platforms and of the receivers of the corresponding cell site beams for the said candidate cell site beam assignments; computing the data rate that the estimated SINR supports at the aerial platform, and determining the network throughput for the given candidate cell site beam assignment by summing data rates on all active beams; and repeating the previous steps until either a candidate cell site beam assignment is found that achieves a target network throughput, or until a certain number of candidate cell site beam assignments have been analyzed and the assignment with highest network throughput is chosen. In another embodiment, the cell site controller sends the cell site to aerial platform beam assignment to the radio sub-systems of cell sites, and the cell site radio sub-system sends the cell site to aerial platform beam, frequency and time slot assignments to the said aerial platforms on the forward link control channels. In another embodiment, the cell site to aerial platform beam assignment is determined to ensure a minimum data rate is achieved at each aerial platform and cell site receiver. In another embodiment, the aerial platform in idle state moves into active state when it has data to send, the aerial platform informs the cell site controller it is moving into active state, and the cell site controller assigns the said aerial platform to an active state beam according to the beam assignment computed by the cell site controller.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, as the scope of the invention is best defined by the appended claims.

Various inventive features are described below that can each be used independently of one another, or in combination with other features. Broadly, some embodiments of the present invention generally provide a way to communicate among a set of aerial platforms and a set of ground cell sites.

The present disclosure describes aspects of a system designed to provide broadband access to aerial platforms. Such aerial platforms may include, for instance, drones, UAVs, balloons, blimps, airships, general aviation, and commercial aircraft etc.

FIG. 1 illustrates an exemplary ground coverage area 100 divided into a contiguous set of smaller conceptual hexagonal coverage areas 110-$j$, and a cell site equipment 160-$j$ in each coverage area, j an integer index identifying different coverage areas and different cell site equipment of the same type. The network of cell sites and cell site equipment of FIG. 1 provide connectivity to aerial platforms 140-$i$ shown by a cross shape in FIG. 1, i an integer index identifying different aerial platforms of the same type. In the exemplary illustration of FIG. 1, the dotted lines in each cell coverage area 110-$j$ divide the cell area into six conceptual triangular areas 112, referred to as sectors. The reason for dividing the cell coverage area 110 into multiple smaller sectors 112 is to increase the overall network data throughput, and the number of aerial platforms that communicate with the cell site. Note that the cell coverage area may be divided into any number of sectors, 2, 3, 4 or more. The example of 6 sectors is used only for illustration purposes in this disclosure, a person of ordinary skill in the art will readily recognize that number of sectors other than 6 may be used without departing from the scope of the disclosure.

Figure 2A:
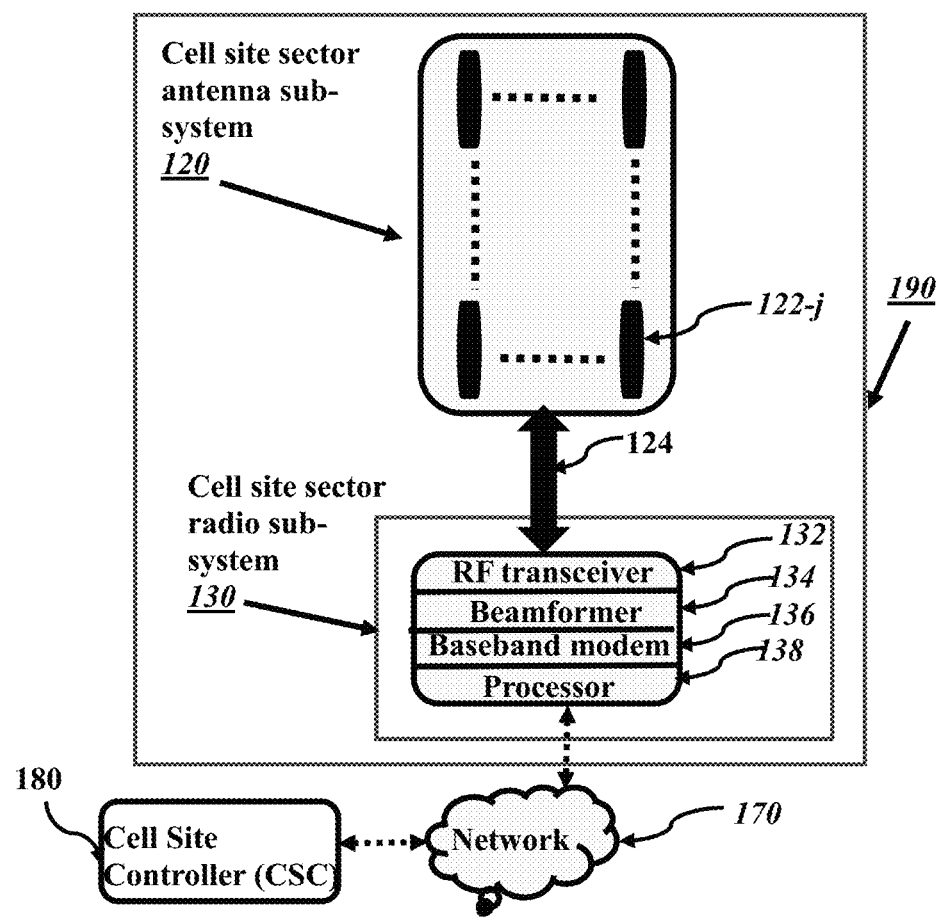
FIG. 2A illustrates an exemplary block diagram of communications equipment at the sector of a cell site, according to some embodiments.

FIG. 2A illustrates one exemplary embodiment of the cell site sector equipment 190 of one sector of a cell site. In the exemplary diagram of FIG. 1, where each cell site coverage area is divided into 6 sectors, there are 6 instantiations of cell site sector equipment 190 providing connectivity to aerial platforms in the corresponding sectors, comprising the cell site equipment 160. The cell site sector equipment 190 comprises two main sub-systems, the antenna sub-system 120, and the radio sub-system 130. The exemplary antenna sub-system 120 depicted in FIG. 2A is a panel composed of a number of antenna elements 122-$j$, j an integer index identifying different elements of the same type. The signals that are applied to the different elements 122-$j$ of the antenna sub-system 120 are phased in such a way as to shape the antenna beam according to a desired pattern, and to point the peak of the beam in azimuth and in elevation toward a certain specified direction where there are aerial platforms.

Some examples of the cell site antenna beam pattern shaping requirements are described next. There are two main signal paths from the aerial platform to the cell site, the line of signal path, and the reflection from the ground also referred to as the specular reflection. The line of sight and specular reflection may—depending on factors such as the distance between the transmitter and receiver, height of the cell site and drone antennas and the ground reflection coefficients—add destructively and cause fading to the signal at the receiver. One solution to mitigating fading due to ground reflection is to reduce the cell site antenna gain below horizon so that the ground reflection is attenuated. Furthermore, the cell site antenna gain toward the ground, i.e. below horizon, should designed to be low in order to minimize interference to other devices that may be using the same frequency band on the ground. Therefore, one requirement is that the cell site antenna pattern be shaped to have low gain below horizon. Since the aerial platforms fly well above the horizon with respect to the cell sites, the cell site antenna gain above horizon determines the quality of communications link to the aerial platform. As the aerial platform distance from the cell site increases, the signal attenuation due to path loss also increases. Therefore, the cell site antenna gain needs to increase at larger distances, as the elevation angle from the cell site toward the aerial platform decreases, in order to compensate for the additional path loss. A cell site antenna pattern whose gain pattern above horizon at different locations from the cell site is shaped such as to compensate for the difference in the path loss at the corresponding locations, is said to have isoflux property. Therefore, the different antenna elements 122-$j$ of the cell site antenna 120 are ideally phased to provide low gain below horizon, have approximate isoflux property above horizon over at least a certain range of elevation angles, and point the peak of the beam toward a given angular position in azimuth and elevation.

The cell site sector equipment radio sub-system 130, as depicted in FIG. 2A, comprises: an RF transceiver 132 that converts the baseband signal to RF frequency of operation; a beamformer sub-system 134 that determines the phases that need to be applied to signals destined to each antenna element to generate the beams for each sector; a baseband sub-system 136 that carries out baseband signal processing functions such as error correction encoding and decoding, modulation, and demodulation; and a processor sub-system 138 to implement functions such as upper layer protocols, assignment of radio resources such as cell site beams, frequency channels and time slots on each channel to aerial platforms, sector beam management, mobility management, and security features. The cell site sector equipment 190 is connected to the Cell Site Controller (CSC) sub-system 180 via network 170. The CSC 180 coordinates activities such as handoff of aerial platforms from one cell site to another, sends configuration parameters to aerial platforms, configures the cell site equipment parameters, and implements network wide assignment of radio resources to aerial platforms as will be further discussed in the remainder of this disclosure. Note that the CSC may be collocated with one of the cell sites, or be implemented by cell site equipment of one the cell sites as long as CSC has connectivity to other network elements for exchange of information.

Figure 2B:
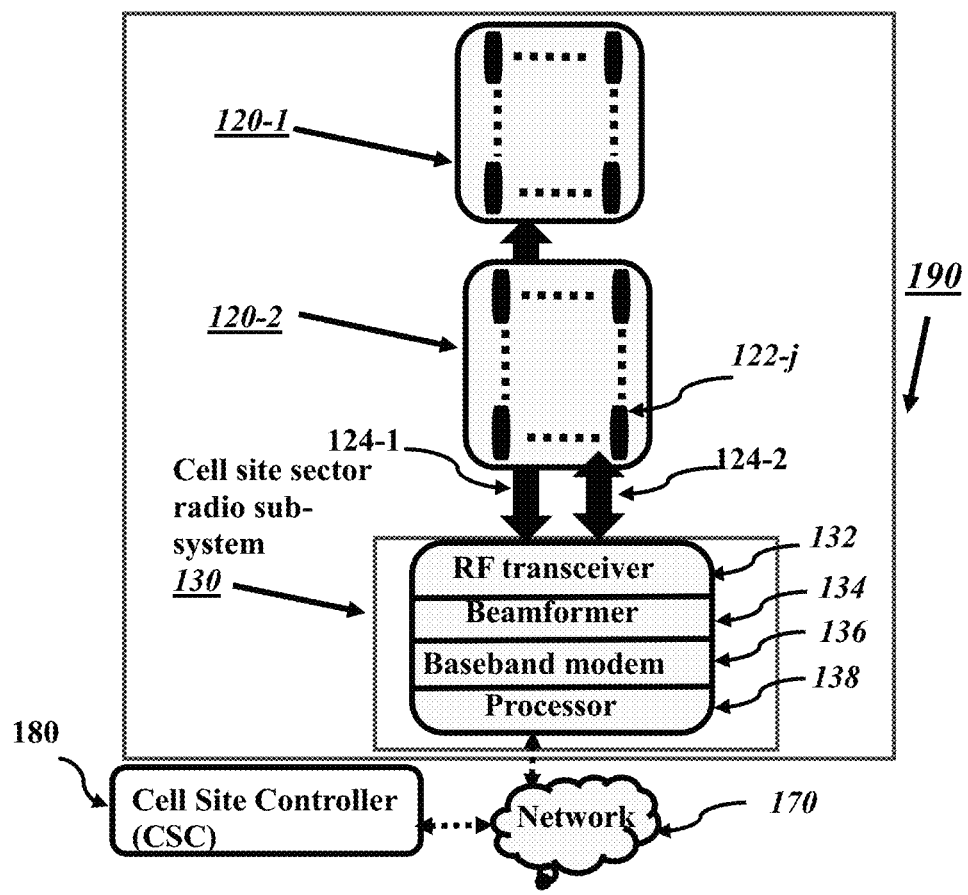
FIG. 2B illustrates an exemplary block diagram of communications equipment at the sector of a cell site, according to some embodiments.

The fading due to ground reflection described above is a function of the distance between the transmitter and the receiver. At some distances between the transmitter and the receiver, the line of sight and ground reflection signals even add constructively resulting in a stronger combined signal at the receiver. For a given transmitter and receiver distance, the ground reflection induced fading is also a function of the height of the cell site antenna above ground. For the same transmitter and receiver distance, at some cell site antenna heights the signals may even add constructively. Therefore, it is advantageous to include multiple antenna apertures at the cell site to create diversity to help mitigate ground reflection induced fading. FIG. 2B illustrates a cell site sector equipment comprised of two antenna apertures 120-1 and 120-2, connected to the radio sub-system 130 via interfaces 124-1 and 124-2. A first antenna aperture 120-1 is placed above the second antenna aperture 120-2. In one embodiment, the cell site radio sub-system 130 estimates the signal quality received on the two antenna apertures from the aerial platform, and chooses the antenna aperture with stronger signal for communications with the aerial platform. In another embodiment, the cell site radio sub-system combines the signals from the two antennas using baseband signal processing techniques such as maximal ratio combining and uses the combined signal for demodulation.

The ground reflection induced fading is also present at the aerial platform receiver. If at a given time the cell site antenna is in a fade due to ground reflection, the aerial platform antenna may also be in fade. Also, even if at a given time the cell site antenna is not in fade, the aerial platform antenna may be in fade because of potentially different hardware induced delays on the cell site to aerial platform and aerial platform to cell site links or if the cell site to aerial platform and aerial platform to cell site links use different frequency channels. Therefore, a mechanism is also needed to mitigate fading at the aerial platform antenna. In one embodiment, the cell site radio sub-system transmits to the aerial platform on the cell site antenna aperture from which it receives the highest signal power from the aerial platform. In another embodiment, the cell site radio sub-system sequentially transmits reference signals to the aerial platform on the two antennas where the reference signals identify what antenna they are sent on; the aerial platform radio sub-system estimates the signal strength received on each of the two reference signal transmissions from the cell site, and informs the cell site radio sub-system on which reference signal it receives a stronger signal. The cell site radio sub-system transmits to the aerial platform on the antenna aperture that the drone receives a stronger signal. FIG. 2B, and the above description considered two antennae at the cell site. However, a person of ordinary skill in the art will readily recognize that the embodiments described in this disclosure can be described in conjunction with more than two antenna apertures without departing from the scope of the disclosure.

In one embodiment, the beamformer sub-system may carry out the beam forming function digitally by applying appropriate phases to baseband signals destined to different antenna elements to form the desired beams in the sector. In another embodiment, the beamformer determines the phases for each antenna element to achieve the specified beam pattern, but the phases are applied at RF stage by the RF transceiver 132 or by the circuitries that are part of the antenna elements **122-*j*. The interface between the RF transceiver and the antenna elements is shown by RF interface sub-system 124. As will be described later in this disclosure, the beamformer 134, the RF transceiver 132 and the antenna sub-system 120** may form multiple simultaneous beams, with each beam pointing in a different direction toward different aerial platforms.

Figure 3A:
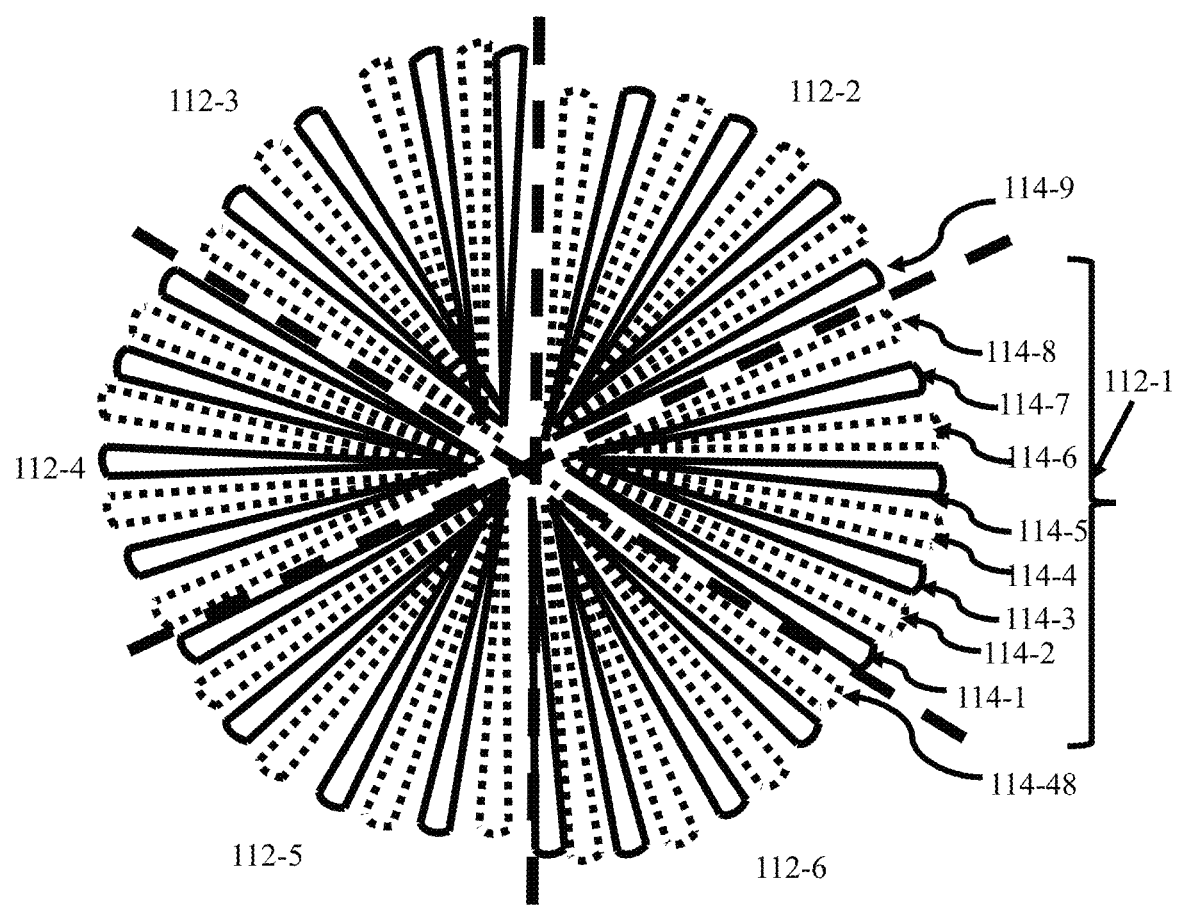
FIG. 3A illustrates an exemplary diagram of the cell site sectors and beams, according to some embodiments.

FIG. 3A illustrates an exemplary cell site with multiple sectors, and multiple beams in each sector. The cell site coverage area is divided into 6 sectors labeled by 112-1, 112-2, 112-3, 112-4, 112-5 and 112-6, delineated by the dashed lines. Each sector is further divided into 8 azimuthal angular areas, where each azimuthal angular area is illuminated by one beam conceptually depicted by narrow triangular shapes in FIG. 3A labeled by **114-*j*, j an integer index identifying different beams of the same type, a total of 48 beams in the example of FIG. 3A. In one embodiment for pointing the beams in a sector, there is a fixed angular position where each beam points as shown pictorially in FIG. 3A, referred to as the fixed beam scheme. In FIG. 3A, the odd numbered beams are shown by solid lines and the even numbered beams are shown by dotted lines. In FIG. 3A, the odd numbered beams shown by solid lines are assumed to be on, i.e. transmitting/receiving, and the even numbered beams shown by dotted lines are assumed to be off, i.e. not transmitting/receiving. In the configuration of on and off beam of FIG. 3A**, no adjacent beams would be simultaneously transmitting/receiving. The reason for not allowing two adjacent beams to be simultaneously on, is to reduce cross-beam interference at the aerial platform or the cell site receivers. Therefore, in this configuration, the odd and even beams would alternately become on and off during consecutive time periods according to some scheduling algorithm, such as to provide connectivity to all aerial platforms in the coverage area of the 48 beams while reducing cross-beam interference.

The azimuthal beamwidth of each of the beams of the exemplary system of FIG. 3A is 7.5 degrees, because each of the 6 sectors covering 60 degrees is divided into 8 smaller beams. The small beamwidth of 7.5 degrees in this example will provide two main benefits. One benefit is high gain toward the aerial platform which helps achieve high data rate to the aerial platform. Another benefit is that the narrow cell site beam beamwidth focuses the signal power toward one aerial platform, and therefore reduces interference to aerial platforms that are communicating with other cell sites in the network and are operating on the same frequency channels. The narrow beamwidth and the aforementioned on-off beam pattern allow simultaneous use of all available frequency channels in all cell sites and in all active (on) beams in each sector, referred to as frequency reuse of 1, thereby achieving very high network throughput. A person of ordinary skill in the art will readily recognize that the cell sites may be divided into a different number of sectors than 6, that each sector may be covered by a different number of beams than 8, that beamwidth of each beam may be different from the one mentioned above, and that other patterns of on and off beams may be imposed on the set of beams in a sector while minimizing the cross-beam interference without departing from the scope of the disclosure.

Figure 3B:
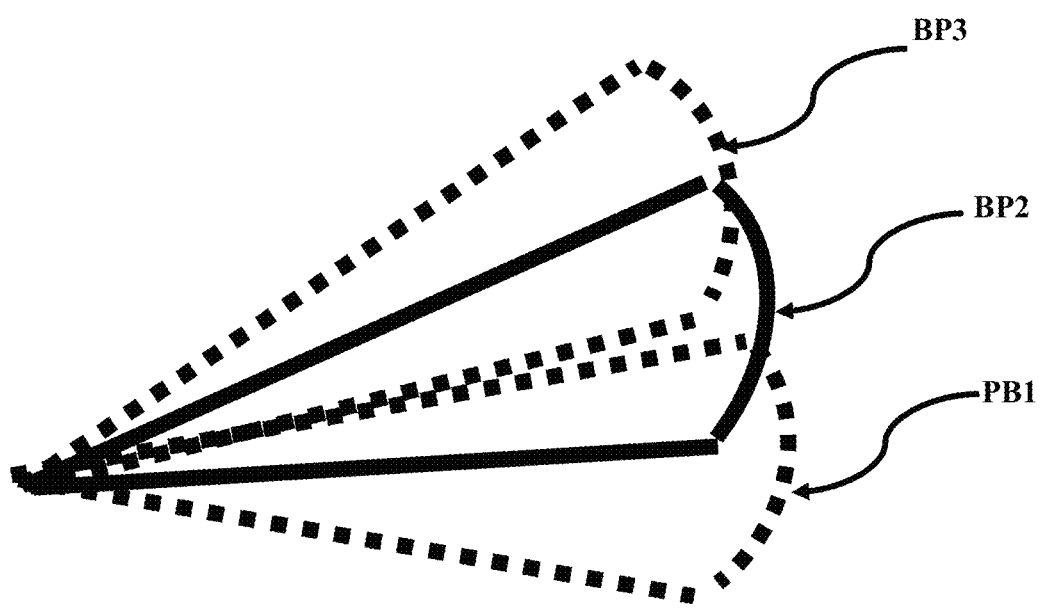
FIG. 3B illustrates an exemplary cell site fine beam positioning scheme in azimuth direction, according to one embodiment.

In the fixed beam system described above in conjunction with FIG. 3A, the peak of the cell site beam will not point toward the aerial platform when the aerial platform is located away from the center of the angular region covered by the fixed beam. Next a variant of the fixed beam scheme, referred to as fine beam positioning, is described that achieves more accurate pointing of the beam toward an aerial platform. A variant of the cell site antenna fine beam positioning, divides each of the 8 angular areas of FIG. 3A into a number of smaller angular areas, as shown by three fixed angular positions labeled as BP1 BP2, and BP3 in FIG. 3B, referred to as refined angular beam positions. For each fixed beam, the refined angular beam position which is closest to the position of the aerial platform is chosen to place the peak of the beam, thereby placing the peak of the beam closer to the aerial platform. In one embodiment for finding the best refined angular position to place the beam, the aerial platform periodically sends its position location coordinates to the cell site radio sub-system with which it is communicating. The cell site radio sub-system communicating with an aerial platform radio sub-system uses knowledge of the position coordinates of the aerial platform to point its beam toward one of the refined angular beam positions, 3 possible positions BP1, BP2, and BP3 in example of FIG. 3B, from which the aerial platform will see the highest cell site beam gain. In a variant of this embodiment, the aerial platform also sends its speed as well as heading to the cell site radio sub-system. Then, the cell site radio sub-system may continuously compute the aerial platform position coordinates and update the refined angular beam position.

In another embodiment for finding the "optimal" refined angular beam position, the cell site radio sub-system instructs the cell site antenna sub-system to sequentially turn on each of the refined azimuthal angular positions, to measure the SINR on the signal received from the aerial platform in each of the refined angular beam positions, and to choose the refined angular beam position on which it receives the highest signal quality (e.g. SINR) as the refined azimuthal angular beam position at which to point the beam toward the aerial platform. The above example of 3 beam positions was chosen for illustration purposes. A person of ordinary skill in the art will readily recognize that any number of refined azimuthal angular positions other than 3 may be used without departing from the scope of the disclosure.

Figure 3C:
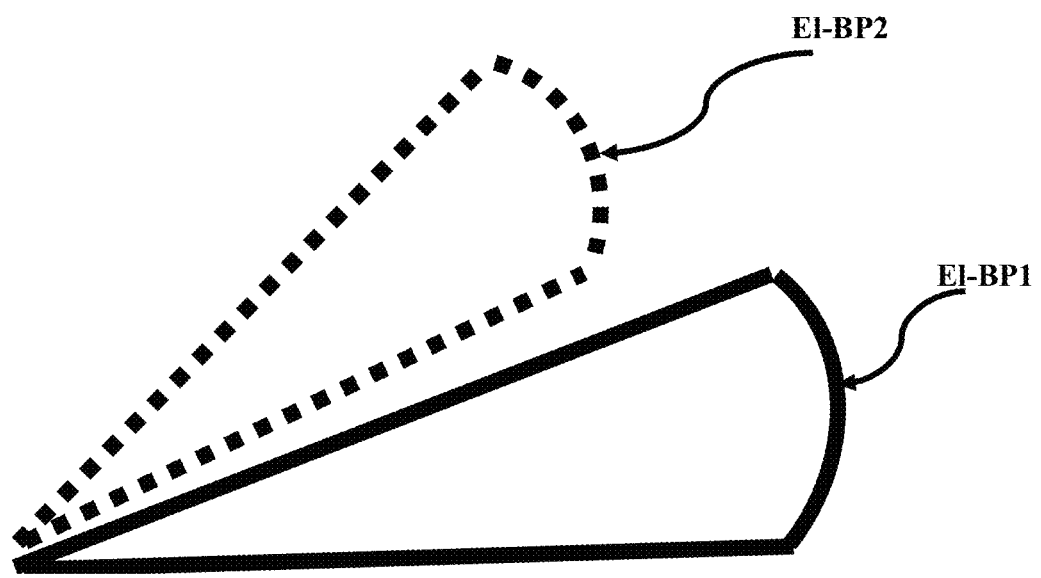
FIG. 3C illustrates an exemplary cell site fine beam positioning scheme in elevation direction, according to one embodiment.

In another embodiment of fine beam positioning, the cell site beam is also more accurately placed on the aerial platform in the elevation angle direction. FIG. 3C illustrates two possible refined angular beam positions in elevation, labeled E1-BP1 and E1-BP2, for each azimuthal beam angle. For more accurate pointing of the beam in elevation, the refined angular beam position in elevation which is closer to the aerial platform is turned on. In FIG. 3C, refined angular beam position in elevation E1-BP1, which covers lower elevations angles, is turned on (illustrated by solid line), and the refined elevation angular beam position E1-BP2 is turned off (illustrated by dotted line). In one embodiment for determining the more accurate elevation angular beam position, the cell site radio sub-system determines, based on the position coordinates of the aerial platform, which refined elevation angular beam position has a higher gain toward the aerial platform and turns the corresponding elevation angular beam position on. In another embodiment, the cell site radio sub-system instructs the cell site antenna sub-system to sequentially turn on each of the possible elevation angular beam positions, to measure the SINR received from the aerial platform in each of the said elevation angular beam positions, and to choose the refined elevation angular beam position on which it receives the highest signal quality (e.g. SINR) as the refined elevation angular beam position at which to point the beam toward the aerial platform. A person of ordinary skill in the art will readily recognize number of elevation angular positions other than 2 may be used without departing from the scope of the disclosure.

In order to provide high data rate to each aerial platform, directional antennas with high gains need to be used at the aerial platform. Another reason for using high gain antennas at the aerial platform is to have a narrow beamwidth in azimuth so that each aerial platform while pointing its beam toward a given cell site with which it is communicating, does not receive much interference from other cell sites in the network which are simultaneously using the same frequency channels. A narrow beamwidth aerial platform beam allows a given frequency channel to be simultaneously used in all cell sites and on all active beams of each cell site, thereby achieving very high network throughput. Therefore, systems and methods are required for designing and operating aerial platform communications system with narrow beamwidth.

Figure 4A:
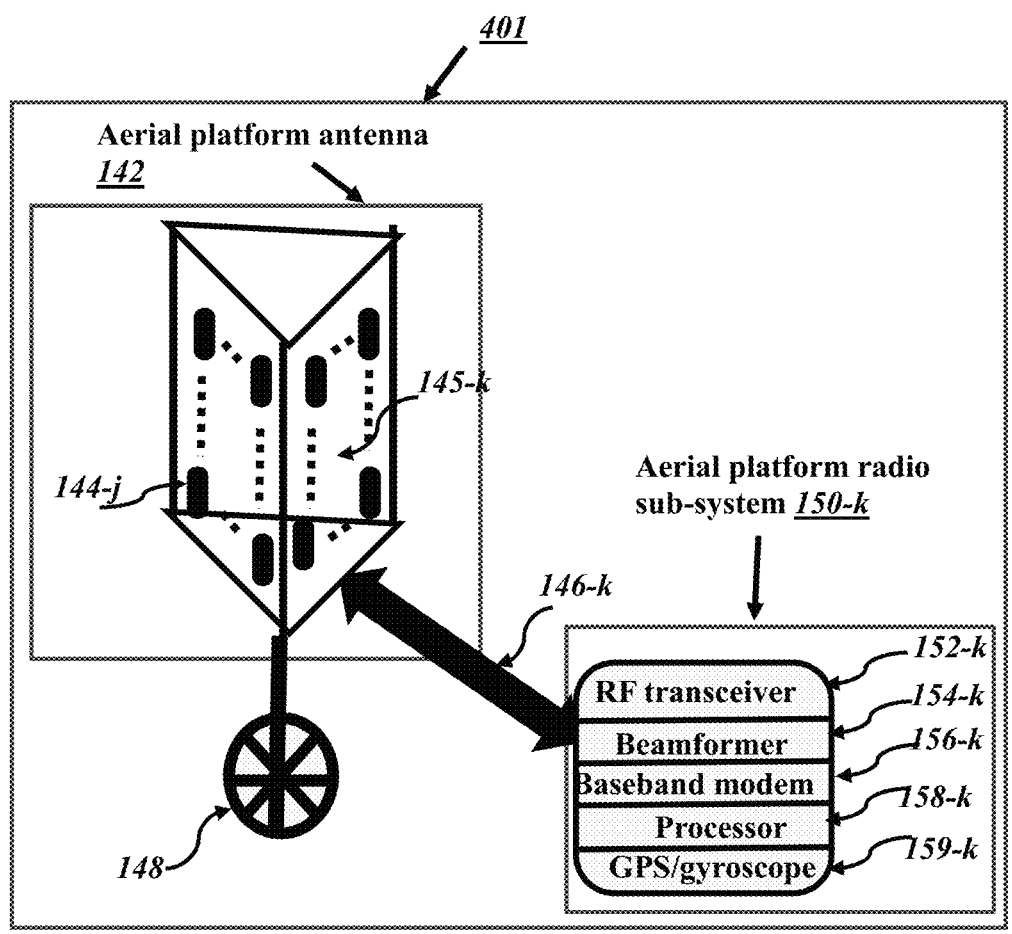
FIGS. 4A and 4B illustrate exemplary block diagrams of the communications equipment of the aerial platforms, according to some embodiments.

FIG. 4A illustrates an exemplary aerial platform communications equipment comprising of two main sub-systems, an antenna sub-system 142, and a radio sub-system 150. The exemplary aerial platform antenna sub-system of FIG. 4A comprises of 3 antenna apertures 145-$k$, k an integer index identifying one of 3 different antenna apertures of the same type. Furthermore, the different antenna apertures may be tilted in different directions. In one embodiment of the antenna aperture 145, as illustrated in FIG. 4A, each antenna aperture further comprises of antenna elements 144-$j$, j identifying different antenna elements of the same type. Examples of antenna elements are dipole or patch elements. The different antenna elements 144-$j$ of a given antenna aperture may be phased to form a beam in a given azimuthal and elevation direction. In one embodiment, the antenna elements 144-$j$ are phased to form a fixed beam that does not change with time. The advantage of a fixed beam is simplicity of the antenna. In another embodiment, the antenna element phases are changed with time in order to more accurately steer the beam toward the cell site as the aerial platform moves and changes its orientation toward the cell site with which it is communicating. In another embodiment, the antenna aperture 145 may be designed using a single element structure, such as a horn structure, to form one fixed beam. The antenna aperture that forms a single fixed beam using a single element structure has the advantage of being simpler and less expensive. A person of ordinary skill in the art will readily recognize that more than 3 antenna apertures may be used for the antenna sub-system of the aerial platform without departing from the scope of the disclosure.

When the antenna aperture 145 is capable of only forming a single fixed beam, there will be antenna gain loss due to so called scan loss in cases where the antenna aperture does not align with the cell site with which the aerial platform is communicating. Even when the antenna aperture is capable of dynamically steering its beam toward the cell site, there will be scan loss whose magnitude depends on the aerial form's orientation with respect to the cell site location. The sub-system 148 of FIG. 4A, is a mechanical device that is capable of rotating the antenna sub-system 142 by a certain angle around its axis, in order to more accurately position the antenna beam toward a cell site. The mechanical device 148 may be a simple electromechanical switch which switches the antenna sub-system 142 to one of a few possible positions. This results in a simple and low weight mechanical switching device which is capable of turning the aerial platform antenna aperture beam toward the cell site with which it is communicating, thereby significantly reducing the scan loss. The aerial platform radio sub-system further comprises of an RF transceiver sub-system 152, a beam former sub-system 154, a baseband sub-system 156, a processor sub-system 158, and a GPS/gyroscope sub-system 159. The GPS/gyroscope sub-system 159 estimates the aerial platform's position location coordinates, as well as the aerial platform antenna sub-systems orientation relative to the cell sites. Sub-system 146 provides an RF interface between the antenna sub-system 142 and the radio sub-system 150.

Figure 4B:
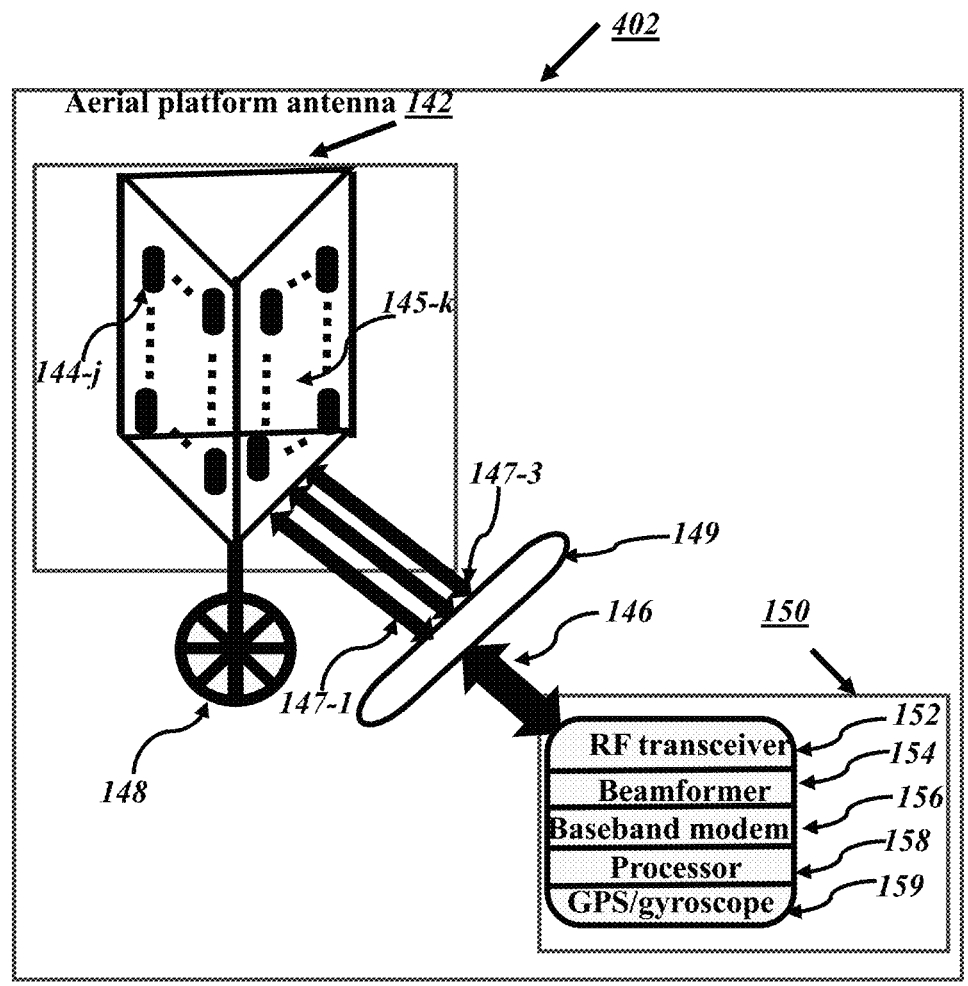

The aerial platform equipment 401 of FIG. 4A shows that each antenna aperture 145-$k$ is connected to a dedicated aerial platform radio sub-system 150-$k$, k an integer index identifying different antenna apertures and radio sub-systems of the same type. The advantage of having a dedicated radio sub-system for each antenna aperture is, as will be discussed later in this disclosure, to facilitate mesh network capability for the aerial platforms, where one aerial platform maintains multiple simultaneous communications links in different azimuthal directions. In the mesh network configuration, one aerial platform may be simultaneously communicating with multiple aerial platforms or cell sites. It is possible to have a number of radio sub-systems fewer than the number of antenna apertures, and switch the radio sub-systems to the antenna apertures that are being used for communications. FIG. 4B illustrates an exemplary aerial platform communications equipment which comprises of only one radio sub-system 150. In the system of FIG. 4B, the single radio sub-system 150 is switched to an antenna aperture 145-$k$ being used for communication, using the RF switching sub-system 149. The RF switching sub-system 149 has connections to all 3 antennas, and to the radio sub-system 150 via RF interfaces 147-1, 147-2, 147-3, and 146. In general, when there are fewer radio sub-systems than antenna apertures, the radio sub-systems may be shared by an antenna aperture using an RF switching sub-system such as in the exemplary example of FIG. 4B.

In the system of FIG. 4A, since there is a dedicated radio sub-system 150-$k$ for each antenna aperture 145-$k$, one of the radio sub-systems 150-$k$ needs to be identified as the master which receives all signal quality measurements from other radio sub-systems of the same aerial platform, determines the aerial platform antenna aperture from which the strongest signal quality is received, and instructs the aerial platform radio sub-system of the corresponding antenna aperture to start communications with the cell site sector from which the strongest signal quality is received. In the system of FIG. 4B where there is only one radio sub-system 150, the radio sub-system switches from one antenna aperture to the next, measures signal quality on reference signals received from cell sites on each antenna apertures, chooses the aerial platform antenna aperture on which it receives the highest signal quality, and establishes the communications link on the said antenna aperture and with the cell site from which the aerial platform antenna aperture receives the highest signal quality.

The aerial platform antenna sub-system described in conjunction with FIGS. 4A and 4B comprise of at least three antenna apertures to provide coverage in 360 degrees in azimuth using one of the antenna apertures. In another aerial platform antenna design for 360 degree coverage in azimuth, the antenna sub-system 142 comprises of only one antenna aperture and the mechanical steering mechanism 148 steers the antenna aperture in different azimuthal angles such as to point the antenna aperture beam toward a cell site with which the aerial platform radio sub-system is communicating, or to point the antenna aperture beam toward a cell site in order to measure the quality of signal received from the said cell site. The embodiments in this disclosure are described in conjunction with FIGS. 4A and 4B. However, a person of ordinary skill in the art will readily recognize that the embodiments described in this disclosure can be described in conjunction with the mechanically steerable single antenna aperture system without departing from the scope of the disclosure.

Signal to Interference plus Noise (SINR) Computation

Note that since the cell sites make narrow beams toward the aerial platforms, the aerial platforms in the coverage area of a sector will only detect signals transmitted by the cell site sector on those beams that cover the said aerial platforms. Therefore, a mechanism is needed to ensure that the aerial platforms make SINR estimates on reference signals transmitted by all cell sites to which the aerial platform has a line of sight. In one embodiment, during certain time intervals the cell sites transmit a reference signal, such as the beacon signal of 802.11 standard, on a broad beam that covers the whole sector. The aerial platforms point their antenna beams toward specific cell sites using the knowledge of the aerial platforms' position coordinates and the position location of the cell sites in the network, and search for the reference signal transmitted by the said cell site to measure SINR on signals send by the cell sites. In another embodiment, the cell sites periodically send the reference signal on each of the narrow beams when the beams are in transmit mode. Each aerial platform points its beam toward each cell site, waits until the cell site turns the narrow beam that covers the said aerial platform on, and sends the reference signal, at which time the aerial platform measures the signal strength of the reference signal from the cell site.

Many of the embodiments described in this disclosure require an estimate of the received signal quality at the aerial platform or at the cell site radio sub-systems. One exemplary signal quality metric is the Signal to Interference plus Noise Ratio (SINR). In one embodiment, as will be described in detail below, the SINR at the receiver of the cell site or the aerial platform is computed by using information on the aerial platform antenna beams and their patterns, the cell site beams and their patterns, the position coordinates of the cell sites, the position coordinates of the aerial platform, and the azimuthal and elevation orientation of the aerial platform antenna apertures with respect to each cell site. The computed SINR is an estimate of the actual SINR at the different receivers in the network.

Figure 5A:
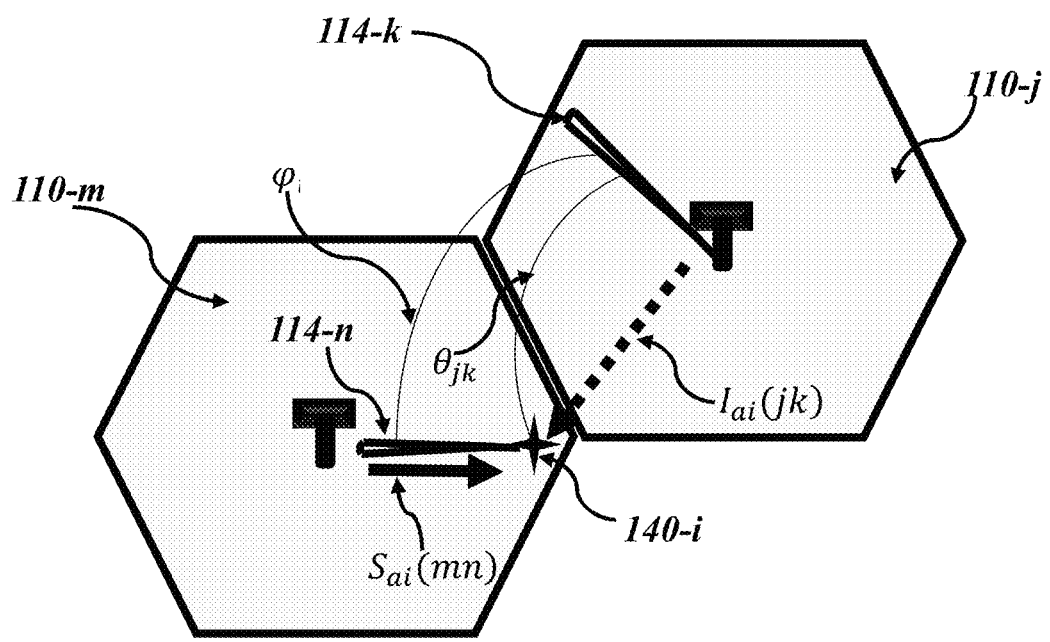
FIG. 5A illustrates an exemplary diagram of a cell site beam causing interference to an aerial platform.

First, the methodology to compute the SINR at the aerial platform receiver is described. As was described in previous embodiments, each cell site may simultaneously generate a large number of beams transmitting on the same frequency channel, 48 beams in the examples discussed above in conjunction with FIG. 3A. Therefore, an aerial platform receiver will receive interference from all beams and all cell sites in the network. FIG. 5A helps describe the methodology used to compute the interference from one interfering cell site beam. As mentioned previously, in the figures of this disclosure different instances of an element of the same type are identified by a dash followed by an integer index. For instance, different aerial platforms are identified by 140-$i$, where i is an integer index identifying different cell sites of the same type.

Referring to FIG. 5A, aerial platform 140-$i$, shown by a cross shape, is communicating with the cell site 110-$m$ using beam 114-$n$ of the said cell site, where n and m are integers. Aerial platform 140-$i$ receives signal power, $S_{ai}(mn)$, shown by the solid arrow; where the first argument in the parenthesis, m, refers to site 110-$m$, and the second argument in the parenthesis, n, refers to beam 114-n of the corresponding cell site, subscript "a" refers to aerial platform, and integer index subscript i refers to the i-th aerial platform 140-i. In order to keep FIG. 5A simple, only one interfering cell site 110-j, and only one interfering beam 114-k in cell site 110-j are shown. A typical network comprises of many cell sites and many beams in each cell site, which would act as interferer to an aerial platform. The interfering signal power received at the aerial platform 140-i from beam 114-k of cell site 110-j, denoted by $I_{ai}(jk)$, where integer index j refers to the cell site 110-j, and integer index k refers to beam 114-k of the corresponding cell site. The subscript "a" of $I_{ai}(jk)$ refer to an aerial platform, and the subscript "i" refers to the i-th aerial platform 140-i. Note that throughput this disclosure subscript "a" refers to aerial platforms, and subscript "c" refers to cell sites. A few more notations are needed to able to write down the received signal and interference power terms. Notation:

a) PL(ij)—propagation path loss from aerial platform 140-i to the cell site 110-j;
b) $G_a$—aerial platform antenna beam peak gain;
c) $G_c$—cell site antenna beam peak gain;
d) $\theta_{jk}$—azimuthal angle from the pointing direction of beam of 114-k at cell site 110-j to the line connecting the center of cell site 110-j, where the cell site equipment resides, and the aerial platform 140-i (see FIG. 5A for a pictorial depiction);
e) $R_c(\theta_{jk})$—roll off of the cell site beam gain toward the aerial platform, at the given angle relative to boresight;
f) $\varphi_{ij}$—azimuthal angle from the pointing direction of beam of aerial platform 140-i to the line connecting center of cell site 110-j and the aerial platform 140-i (see FIG. 5A for a pictorial);
g) $R_a(\varphi_{ij})$—roll off of aerial platform beam gain toward cell site 110-j, at the given angle relative to its boresight;
h) $P_a(i)$—transmit power of aerial platform 140-i PA (Power Amplifier) into the aerial platform antenna connector;
i) $P_c(k)$—transmit power of cell site beam 114-k PA (Power Amplifier) into the cell site antenna connector.

FIG. 5A illustrates a pictorial depiction of a cell site interference to an aerial platform that helps explain the aerial platform SINR computation that follows. In the SINR computation, it is assumed that aerial platform 140-i, shown by a cross shape in the figure, is communicating with beam 114-n of cell site 110-m as shown by the solid arrow, the boresight of the aerial platform 140-i antenna beam is pointed toward cell site 110-m, and boresight of cell site beam 114-n is pointed toward aerial platform 140-i. Then, the received signal power at the aerial platform 140-i from beam 114-n of cell site 110-m, denoted $S_{ai}(mn)$, is given by $$S_{ai}(mn)=PL(im)P_c(n)G_cG_a \quad (1)$$

The interference power received at the aerial platform from beam 114-k of cell site 110-j, $I_{ai}(jk)$, shown by the dotted arrow, is given by $$I_{ai}(jk)=PL(ij)P_c(k)G_cG_aR_c(\theta_{jk})R_a(\varphi_{ij}) \quad (2)$$

The total interference, $I_{ai}$, from all cell sites and their co-channel transmitting beams received at aerial platform 140-i is given by $$I_{ai}=\Sigma_j\Sigma_kI_{ai}(jk), (j,k)\neq(m,n), \quad (3)$$

where the index j runs over all cell sites, and index k runs over all active (on) beams in each cell site. The SINR received at the aerial platform receiver is then given by the ratio of the quantity in equation (1) to that of equation (3) plus received thermal noise power.

Figure 5B:
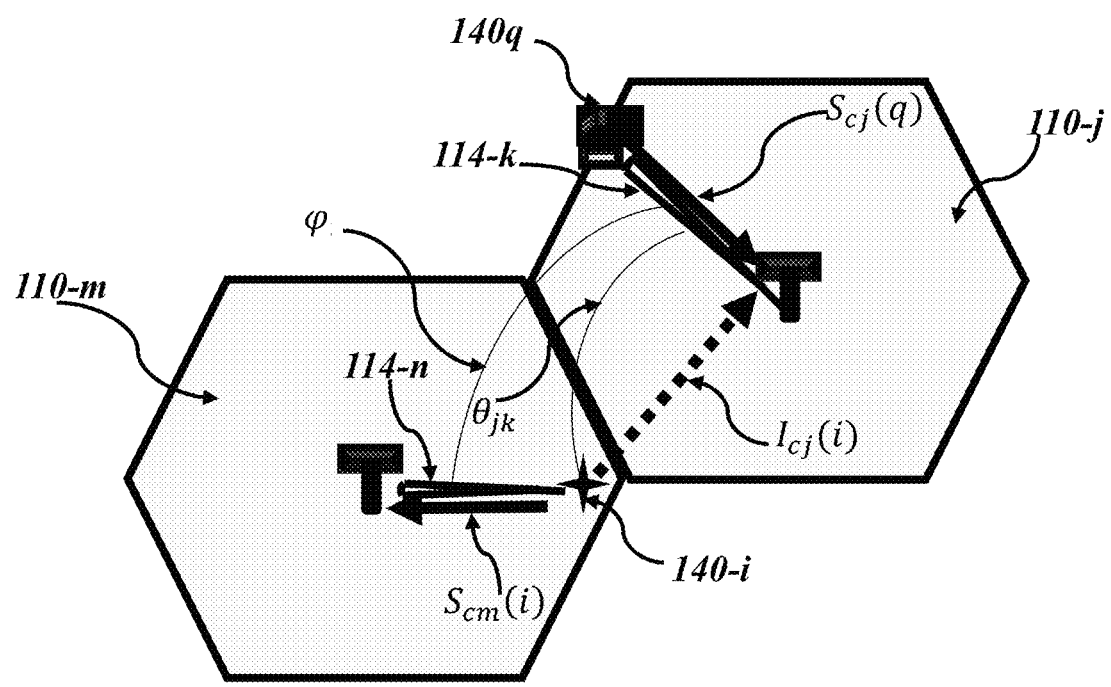
FIG. 5B illustrates an exemplary diagram of an aerial platform causing interference to a cell site beam.

Next, the SINR received at the cell site receivers is computed. FIG. 5B illustrates a pictorial depiction of an aerial platform 140-i causing interference to beam 114-k of cell site 110-j, shown by the dotted arrow. As FIG. 5B illustrates, it is assumed that the aerial platform 140-i is communicating with beam 114-n of cell site 110-m. The interference received, $i_{ckj}(i)$, at cell site receiver of beam 114-k of cell site 110-j from aerial platform 140-i, is then given by $$I_{ckj}(i)=PL(ij)P_a(i)G_cG_aR_c(\theta_{jk})R_a(\varphi_{ij}) \quad (4)$$

The total interference power, $I_{cj}$, received at the cell site receiver of beam 114-k of cell site 110-j 555 from all interfering aerial platforms, other than aerial platform 140-q with which cell site 110-j is communicating, is given by $$I_{ckj}=\Sigma_{i,i\neq q}I_{ckj}(i), \quad (5)$$

where the summation is taken over all aerial platforms except an aerial platform 140-q with which cell site beam 114-k of cell site 110-j is communicating. The received signal power at the receiver of the cell site beam 114-k of cell site 110-j from aerial platform 114-q, $S_{cj}(q)$, is given by $$S_{ckj}(q)=PL(qj)P_a(q)G_cG_a. \quad (6)$$

Then, SINR seen at receiver of beam 114-k of cell site j while receiving the signal from aerial platform 140-q is given by the ratio of quantity in equation (6) to that of equation (5) plus received thermal noise power.

The SINR computations described above are carried out at the cell site controller sub-system of the network. While the above detailed description of SINR computation has shown, described, and pointed out novel features of the invention, it will be understood that various omissions, substitutions, and changes in the form and details of the computations illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims. For instance, in order to simplify the description of the received signal power computation at the aerial platform from the desired cell site given by equation (1), and the received signal power computation at the cell site from the desired aerial platform given by equation (6), it was assumed that the boresight of the aerial platform beam is pointing toward the boresight of the cell site beam with which it is communicating. A person of ordinary skill in the art will readily recognize that equations (1) and (6) may be generalized to represent situations where the boresight of the respective beams may not be pointing to each other, in which case the equations would be revised to reflect the actual value of the beam gains taking into account any roll off from the beam.

Cell Site Beam Assignment

Given that the aerial platform antenna sub-system comprises at least one antenna aperture with a directional beam, and the cell site communications equipment comprises an antenna sub-system that forms at least one directional beam, systems and methods are needed to determine the optimal pair of aerial platform antenna beam and cell site beam on which the aerial platform communicates with the network. Consider the case when the aerial platform radio sub-system powers up and intends to register with the network. The aerial platform radio sub-system needs to choose a cell site, and a sector of that cell site, to which to send its registration message and complete the registration process. In one embodiment, the aerial platform 140 uses the information on the position location coordinates of the aerial platform provided by the GPS/gyroscope sub-system 159, as well as the position coordinates of all cell sites, to determine the cell site which is closest to the aerial platform. The aerial platform then points antenna aperture beam toward the said cell site, and searches for a reference signal from the cell site. Once the aerial platform detects the reference signal from the cell site, it sends a registration message on an access channel to the said cell site to initiate the registration process. Once the aerial platform has registered on the network using a link with a cell site beam, it will send an association message on the corresponding cell site beam requesting to be associated with the said cell site beam.

In a variation of the embodiment for the aerial platform to determine the cell site with which to register, the aerial platform radio sub-system looks up the "optimal" cell site with which to communicate in a table that stores the "optimal" cell sites as a function of the aerial platform position coordinates. In one embodiment, the optimal cell site for a given aerial platform is chosen to be the one that is closest in distance to the aerial platform. Note that in order to contain the size of the aforementioned table, the coverage area would be divided into a number of small bins, and the table would contain the optimal cell site for an aerial platform in the center of each bin, and the aerial platform position is approximated by that of the center of a bin closest to the aerial platform.

Once the aerial platform radio sub-system has registered with the network, it will be in one of two main states, idle or active state. When the aerial platform and the network are not sending data to one another, the aerial platform is said to be in idle state. When in idle state, the aerial platform radio sub-system periodically uses aerial platform's latest position coordinates to determine if another cell site beam provides a higher signal quality. Once a cell site beam with higher signal quality has been found, the aerial platform radio sub-system associates with the new cell site beam, doing what is referred to as an idle handoff. In the idle state, the aerial platform radio sub-system monitors certain data channels such as the paging channel sent on the cell site beams, and moves into active state when it receives a request on the said paging channel from the network to start a data transmission session. Another event that triggers the aerial platform to go into active state is when the aerial platform radio sub-system has data to send, at which time it sends a request to the network on the cell site beam it is monitoring to initiate a data transmission session and moves into active state.

Once the network or the aerial platform initiates a data transmission session, radio resource comprising of a frequency channel, time slots on the corresponding frequency channel, and a cell site beam, must be assigned to the aerial platforms on which to communicate. Since aerial platforms are assigned to all active cell site beams to receive/transmit on the same frequency channel and same time slot, then the radio resource assignment procedure determines which aerial platforms are assigned to each active cell site beam such as to optimize a certain performance criterion. In other words, in the network of frequency reuse of 1 where all frequency channels are simultaneously used on all active beams, radio resource assignment optimization reduces to cell site beam assignment optimization. Therefore, systems and methods are needed by which the "optimal" cell site beams are determined for the aerial platforms on which to simultaneously transmit or receive on the same frequency channel and time slot. Note that radio assignment for a certain time interval is determined in advance and the corresponding assignment is sent to all relevant aerial platforms and cell site sectors prior to the time interval where the radio assignment is applied. One embodiment for determining the "optimal" cell site beams for aerial platforms follows the following steps:

a. assign a set of aerial platforms in active state to candidate cell site beams on the same frequency channel and time slot, referred to as candidate cell site beam assignment;
b. compute the SINR at the receivers of the aerial platforms and of the receivers of the corresponding cell site beams for the said candidate cell site beam assignments using the SINR computation methods of previous embodiments;
c. compute the data rate that the estimated SINR supports at each receiver, and determine the network throughput for the given candidate cell site beam assignment by summing data rates on all active beams;
d. repeat the previous steps until either a candidate cell site beam assignment is found that meets a certain optimization criterion, or until a certain number of candidate cell site beam assignments have been analyzed and the assignment whose performance is closest to a certain criterion is chosen.

Examples of optimization criteria are: maximizing sector throughput; maximizing sector throughput subject to a constraint on packet delay; or maintaining a minimum data rate to/from each aerial platform.

Since computing the SINR at the aerial platform receiver or at the receiver of the cell site beam requires information such as cell site and aerial platform beam patterns, and all aerial platforms which will be simultaneously transmitting/receiving during a time slot on the same frequency channel, then the SINR computation needs to be done by a network entity that has access to such information. One such network entity is the Cell Site Controller (CSC) 180 (FIG. 2A). CSC 180 communicates with all cell sites 110-$j$, and receives latest information on position coordinates of all aerial platforms from cell sites 110-$j$. Note that aerial platforms periodically send their position location coordinates, as well as the azimuthal and elevation orientation of the aerial platform antenna apertures with respect to each cell site or with respect to a reference coordinate system, to the cell site with which they communicate, and the corresponding cell site radio sub-systems forward the aerial platform position location information to the CSC. Once the CSC determines the set of aerial platforms which will be assigned to a cell site beam, a frequency channel, and a time slot on the frequency channel, the CSC will send information on the scheduled aerial platforms as well as the radio resource assignment for each of those aerial platforms to each cell site sector radio sub-system 130. The cell site sector radio sub-system 130 then schedules transmissions to/from the scheduled aerial platforms in its coverage area according to the radio resource assignment for the said aerial platforms.

As was described previously in one set of embodiments, an aerial platform in idle state associates with the cell site to which it is closest. However, once an aerial platform moves into active state, the cell site beam assignment computed by the CSC may assign the said aerial platform to a beam on a cell site other than the one the aerial platform was associated with in the idle state. In this case, a mechanism is needed to inform the aerial platform moving into the active state that it needs to point a beam toward a different cell site, and to associate with the new cell site, referred to as cell site reassignment. In one embodiment, the cell site reassignment is carried out by sending a message to the aerial platform on a control channel of the cell site sector which the aerial platform monitors in the idle state. One example of a control channel is the so-called paging channel which is used to send messages to the aerial platform in idle state.

The cell site beam assignment optimization embodiment described above is a central optimization scheme where a central network element that has access to the state of all cell sites and aerial platforms, such as CSC 180 in FIG. 2A, is needed to carry out the computations. Since central cell site beam assignment algorithms have knowledge all aerial platforms which are simultaneously receiving/transmitting, they make the cell site beam assignments in such a way as to minimize interference at the receivers. Decentralized cell site beam assignment schemes are less efficient in reducing co-channel interference at the receivers, but are simpler to implement and have less dependence on a central processor. In one decentralized cell site beam assignment embodiment, the cell site radio sub-systems assign an aerial platform in active state to the same cell site and beam as that of the aerial platform's idle state. In this scheme, there will, on average, be more interference at the aerial platform or cell site receivers because the beam assignment algorithm is not able to jointly minimize interference at the receivers of different cell sites. One approach to mitigating the effect of interference for decentralized cell site beam assignment systems is the so called Incremental Redundancy (IR) retransmission scheme. IR scheme encodes the data packet using a relatively low rate error correction code, but in the first transmission of the data packet the transmitter sends a small portion of the redundancy bits along with the information bits. If the data packet is not correctly decoded at the receiver, the transmitter is informed which then sends additional redundancy bit. This process of transmitting additional redundancy bits continues a number of times until the data packet is correctly decoded, or the transmission of the original data packet is repeated afresh. It can be seen that IR allows the transmitter to send the data packet at a data rate assuming there is little interference thereby achieving high data rate, while recovering gracefully from occasional additional interference through transmission of additional redundancy bits.

Once a cell site beam assignment has been determined, and the set of active aerial platform have been assigned to cell site beams, frequency channels, and time slots, then the aerial platform and cell site transmitters need to determine the "optimal" data rate at which they may send data packets. One definition of "optimal" data rate may be defined as the data rate such that the receivers of the corresponding link be able to decode the packets correctly with high probability. In a system where, Incremental Redundancy (IR) is employed, the "optimal" data rate may be defined as the data rate at which data packets are decoded correctly with high probability after multiple transmissions of additional redundancy information subject to a packet transmission time delay. In one embodiment, the CSC 180 (FIG. 2A) determines the optimal data rate at which the aerial platform or the cell site may transmit using the SINR values at the aerial platform and cell site beam receivers computed during cell site beam assignment optimization step described previously. The CSC sends indexes of the determined data rates to the cell site radio sub-systems. The cell site radio sub-systems in turn send the indices for the reverse link data rate to the aerial platforms. In one decentralized cell site beam assignment embodiment, the aerial platforms and cell site receivers make multiple SINR measurements over a certain time interval, average the corresponding SINR measurements, and then use the computed average SINR to determine the optimal data rate according to a given data rate optimization criterion.

Cross-Beam Interference Reduction Techniques

Figure 6A:
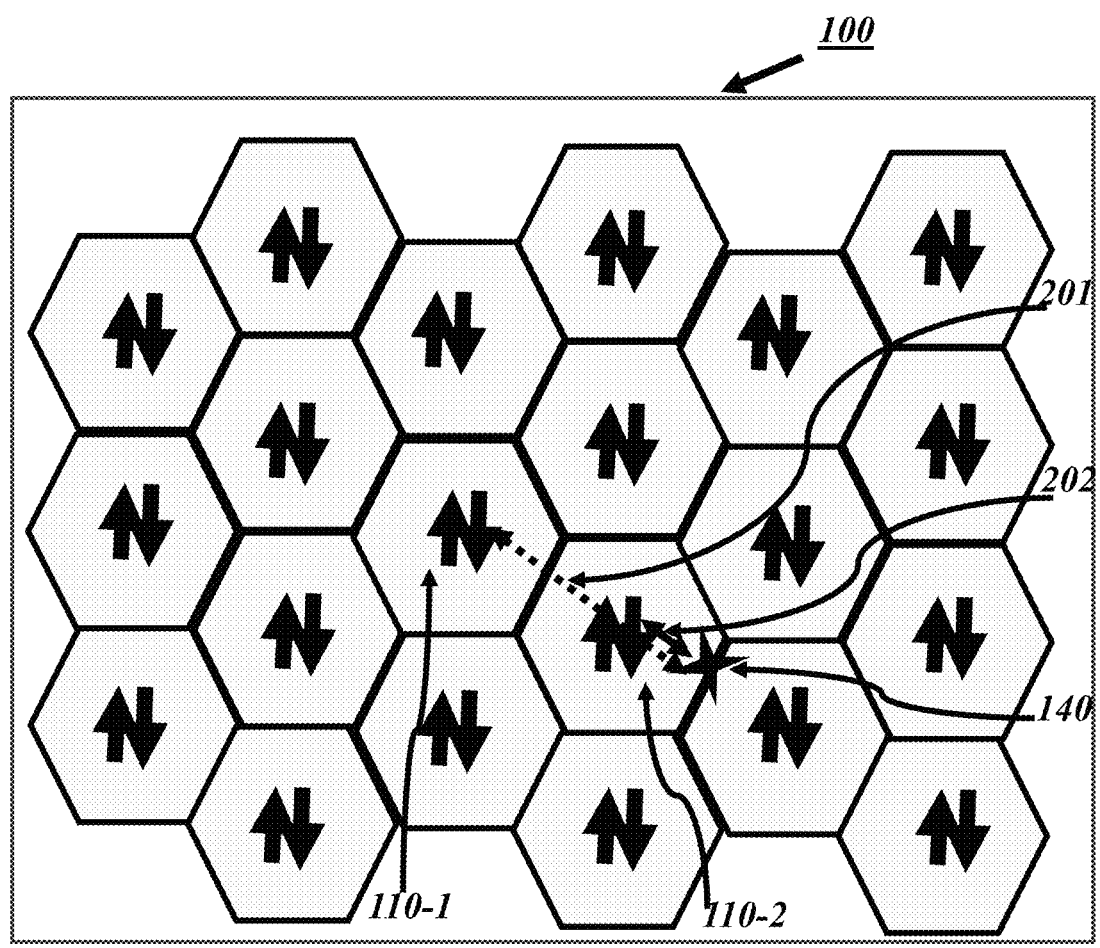
FIGS. 6A and 6B illustrate exemplary diagrams of a network of cell sites with different forward link and reverse link duplexing options, according to some embodiments.

In one set of embodiments, the multiple access protocol used for the ATG system is a Time Division Duplex (TDD) scheme, where the aerial platform and the cell radio sub-systems transmit on the same frequency channel one at a time alternatively in consecutive time periods. FIG. 6A illustrates the network of cell sites where aerial platform 140, shown by a cross shape in the figure, is communicating with cell site 110-2. The pair of arrows in the center of each cell site in FIG. 6A, all of the same type, imply that all cell sites are synchronized to the same duplexing mode, i.e. simultaneously transmitting on the forward link (cell site to aerial platform direction), or receiving on the reverse link (aerial platform to cell site direction). The solid double arrow line 202 depicts the communications link between the aerial platform 140 and cell site 110-2. In the example of FIG. 6A, the aerial platform, and the centers of two cell sites 110-1 and 110-2 where the cell site antennas are located are aligned. Since the directional antenna of the aerial platform 140 is pointed toward the center of cell site 110-2, then it is clear that if cell site 110-1 is also transmitting on a beam that is aligned with aerial platform 140, aerial platform 140 will receive interference from cell site 110-1 transmitter depicted by the dotted double arrow line 201. Note that regardless of how narrow the beamwidth of the aerial platform 140 antenna beam is, the aerial platform will receive interference from the beam of cell site 110-1 that is pointing toward the aerial platform.

The impact of interference from the center of cell site 110-1 in FIG. 6A may be mitigated by having the aerial platform radio sub-system measure SINR (Signal to Interference plus Noise) of all cell sites from which it receives a signal, and choose the cell site from which it receives the strongest SINR to which to communicate, even if the said cell site is not nearest to the aerial platform.

Figure 6B:
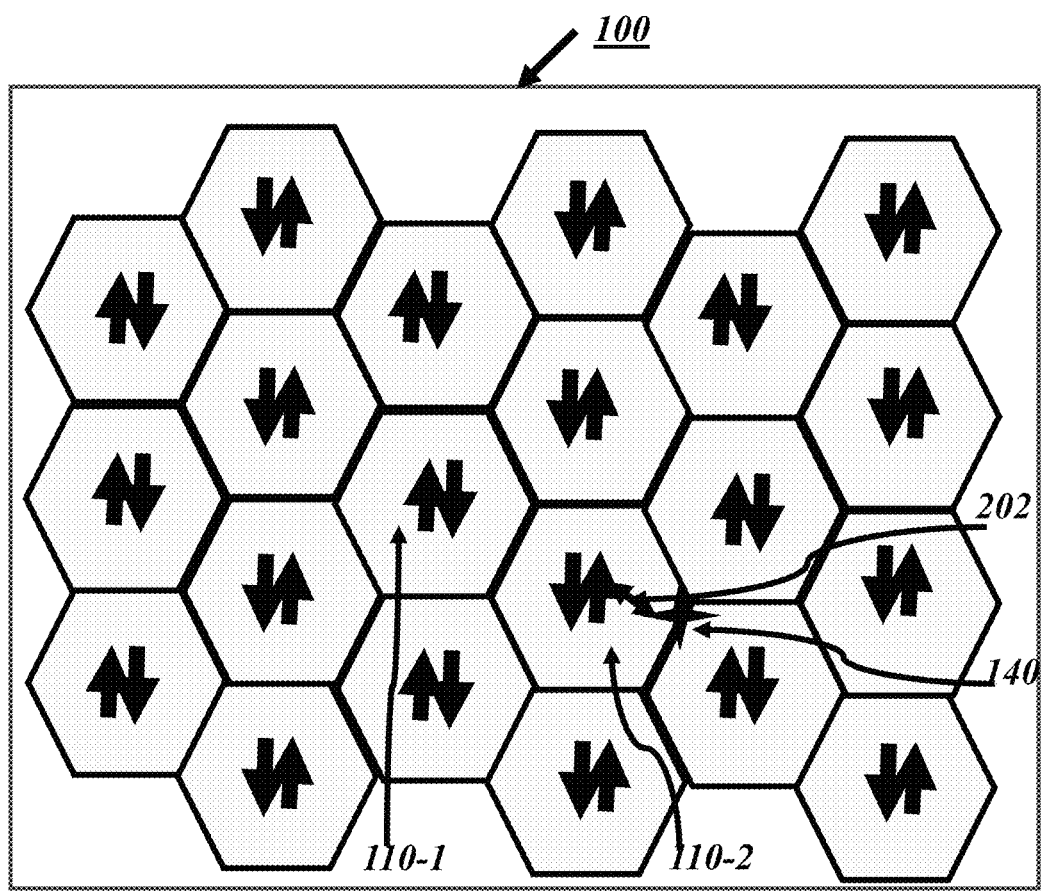

In another embodiment, a different duplexing scheme among cell sites is devised to reduce the impact of the interference scenario described above in conjunction with FIG. 6A. FIG. 6B illustrates a duplexing scheme where cell sites in different rows of the network have opposite forward link (cell site to aerial platform direction) and reverse link (aerial platform to cell site) duplexing phases, as shown by the pairs of up and down arrows in each cell. In one row of cells, the up arrow is before the down arrow, and in the next row the down arrow is before the up arrow, signifying opposite duplexing phases in the different rows. When the cell sites identified by the same pair of arrows are simultaneously transmitting on the forward link direction, the cell sites identified with the opposite pair of arrows are simultaneously receiving on the reverse link, and vice versa. Then, as the aerial platform 140 is receiving on the forward link from cell site 110-2, the cell site 110-1 is not transmitting on the forward link, and therefore no interference is seen at aerial platform 140 from cell site 110-1. Similarly, when aerial platform 140 is transmitting to cell site 110-2 on the reverse link, cell site 110-1 is transmitting on the forward link, and therefore cell site 110-1 does not receive interference from aerial platform 140 on the reverse link. This is the reason the dotted line 201 showing interference between the aerial platform 140 and cell site 110-1 in FIG. 6A has been removed in FIG. 6B where the alternate duplexing scheme is employed.

Figure 7A:
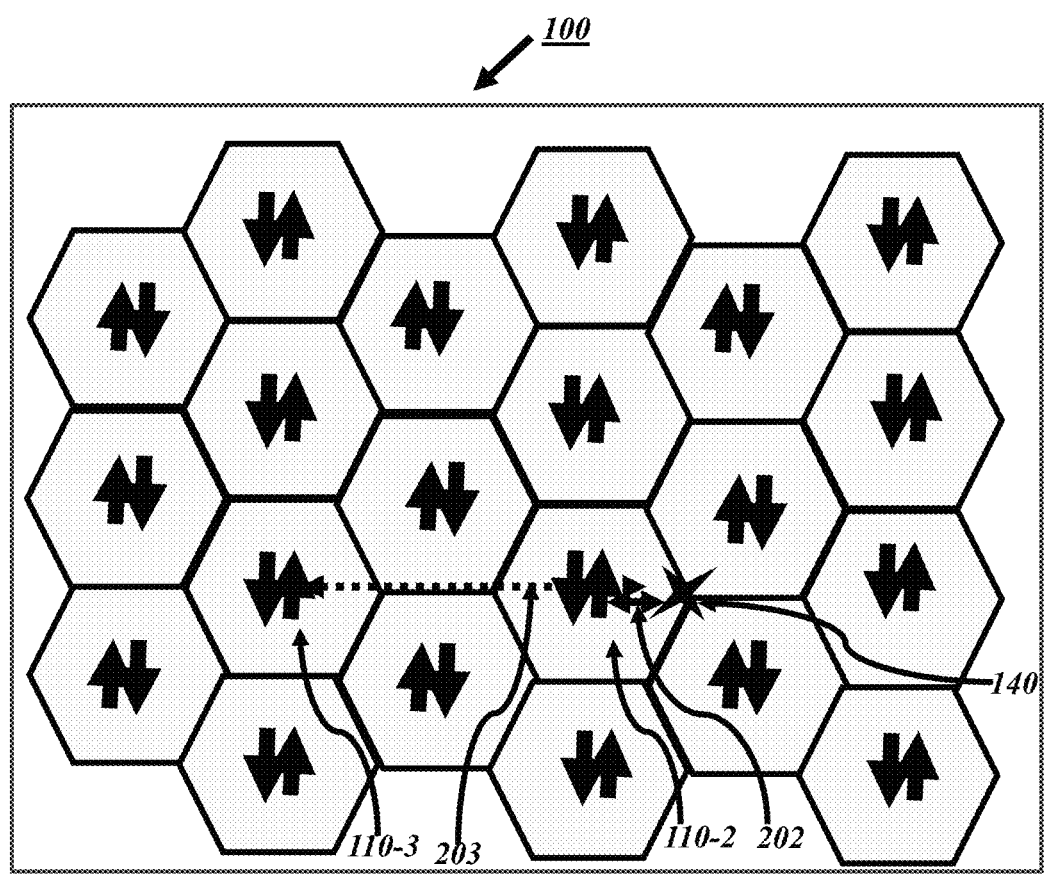
FIGS. 7A and 7B illustrate exemplary diagrams of a network of cell sites with different active beam pattern options, according to some embodiments.

The network illustrated in FIG. 7A, uses the above mentioned alternative duplexing in alternative rows, as shown by the up/down and down/up pairs of arrows. FIG. 7A illustrates a scenario where the aerial platform 140 is aligned with cell sites 110-2 and 110-3. As can be seen, cell sites 110-2 and 110-3 have the same duplexing phase, i.e. are transmitting, or receiving at the same time, and therefore aerial platform 140 while receiving on the forward link from cell site 110-2 on link 202, also receives interference from cell site 110-3 on link 203. In one embodiment for minimizing interference to aerial platform 140 in the scenario depicted by FIG. 7A, the aerial platform 140 measures SINR from all cell sites from which it receives a signal, determines the cell site from which it receives the strongest SINR, and initiates communications with the said cell site.

Next, another embodiment for mitigating the interference from the aligned co-channel cell site 203 to aerial platform 140 is described. As described in the embodiment of FIG. 3A, each sector of a cell site at a given time only transmits/receives on odd or even numbered beams in order to avoid cross-beam interference. In the embodiment illustrated by FIG. 7B, the cell sites in each row alternately use odd or even numbered beams on which to communicate at a given time. In a given time interval, the cell sites identified by Odd/Even transmit/receive on odd beams and cell sites identified by Even/Odd transmit/receive on even beams; in the next time interval, the cell sites identified as Odd/Even transmit/receive on even beams and the cell sites identified by Even/Odd transmit/receive on odd beams. In other words, during a given time interval the cell sites labeled Odd/Even and Eve/Odd will be transmitting/receiving on a different set of beams. Then, it is clear from FIG. 7B that when aerial platform 140 is communicating with cell site 110-2 on a given beam, cell site 110-3 is not transmitting on the same beam thereby reducing interference to aerial platform 140. As a result, the dotted line 203 of FIG. 7A which depicts interference from cell site 110-3 to aerial platform 140 has been removed in FIG. 7B. As mentioned previously, the 8 beams per sector of FIG. 3A is just one example to help describe the embodiment, and more or fewer beams may cover a sector without departing from the scope of this disclosure.

Mitigating Interference from External Sources

Figure 8A:
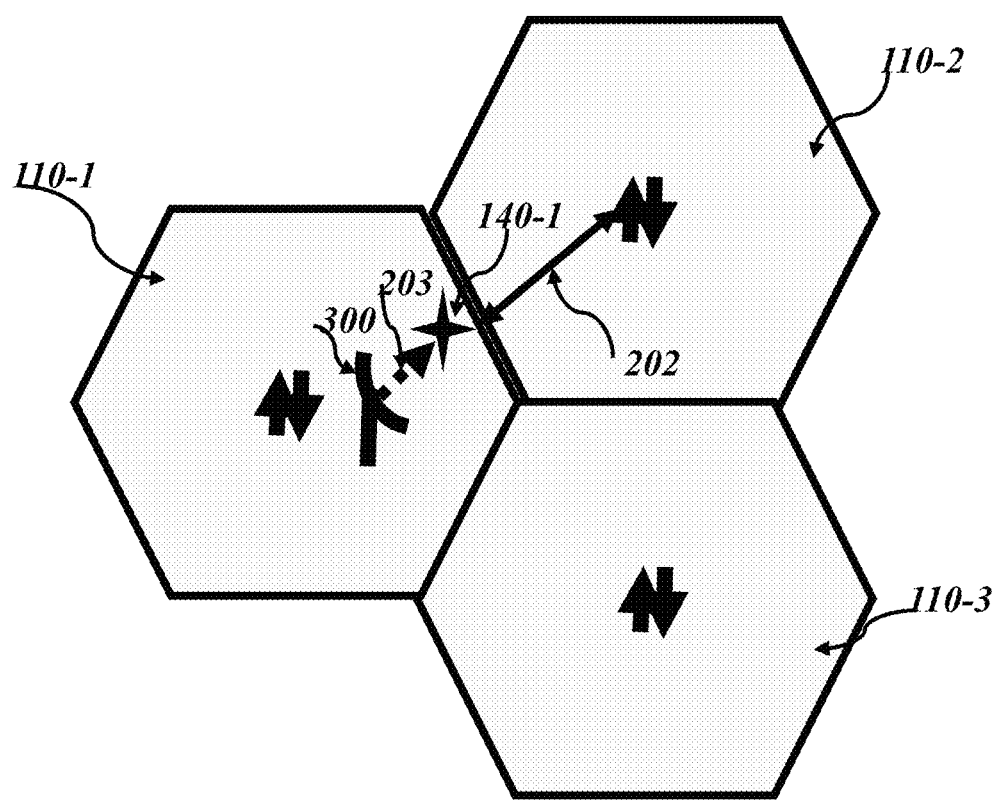
FIGS. 8A and 8B illustrate schematic diagrams of aerial platforms mitigating external interference sources, according to some embodiments.

When there are other systems in the band being used by the aerial platforms, there may be cases where an interfering device is located between an aerial platform and the cell site with which the aerial platform intends to communicate. FIG. 8A illustrates a scenario where an interferer 300 is located between the aerial platform 140-1 and cell site 110-1 which is closest to the aerial platform 140-1. In the absence of interferer 300, aerial platform 140 would communicate with cell site 110-1 in order to establish a link with highest SINR. However, the interfering signal 203 from interferer 300 may significantly reduce the SINR aerial platform would receive from cell site 110-1. In this case, the aerial platform 110-1 may estimate SINR received from cell sites 110-1, 110-2, and 110-3 and choose the one from which it receives the highest SINR which would be link 202 to cell site 110-2.

In one embodiment for mitigating interference from external sources of interference, once the received signal quality, such as SINR, measured at the aerial platform radio sub-systems on a given antenna aperture/beam falls below a threshold, the aerial platform radio sub-system searches for reference signals from other cell sites or on other aerial platform antenna aperture/beams. If stronger signal quality is received from a different cell site, then the aerial platform radio sub-system hands off the call to the link between the aerial platform antenna aperture/beam and the cell site on which strongest signal quality, such as SINR, is detected. In another embodiment, the aerial platform radio sub-system periodically switches the radio sub-system to a different aerial platform antenna aperture/beam and searches for reference signals from other cell sites, and if a signal with stronger quality is received from a different cell site and/or on a different aerial platform antenna aperture/beam, then handoff to the link between an aerial platform antenna aperture/beam and cell site with strongest signal quality is initiated. In another embodiment, the aerial platform communications equipment comprises of more than one aerial platform radio sub-system, and at least one aerial platform radio sub-system is dedicated to continuously search for reference signals from other cell sites, and if a stronger signal quality is detected, then handoff to the link between the cell site and the aerial platform antenna aperture/beam on which the strongest signal quality is received is initiated.

After an initial call set up or a handoff, when an aerial platform radio sub-system 150 determines the "optimal" pair of cell site beam and aerial platform antenna aperture/beam on which to communicate, and associates with the corresponding cell site, the aerial platform radio sub-system 150 uses the information on position coordinates of the aerial platform and the orientation of the aerial platform antenna sub-system 142 with respect to the said cell site, provided by the aerial platform sub-system 159, to instruct the aerial platform mechanical device 148 to switch to one of the possible antenna fixture 142 positions that provides the highest aerial platform antenna aperture beam gain toward the cell site.

Figure 8B:
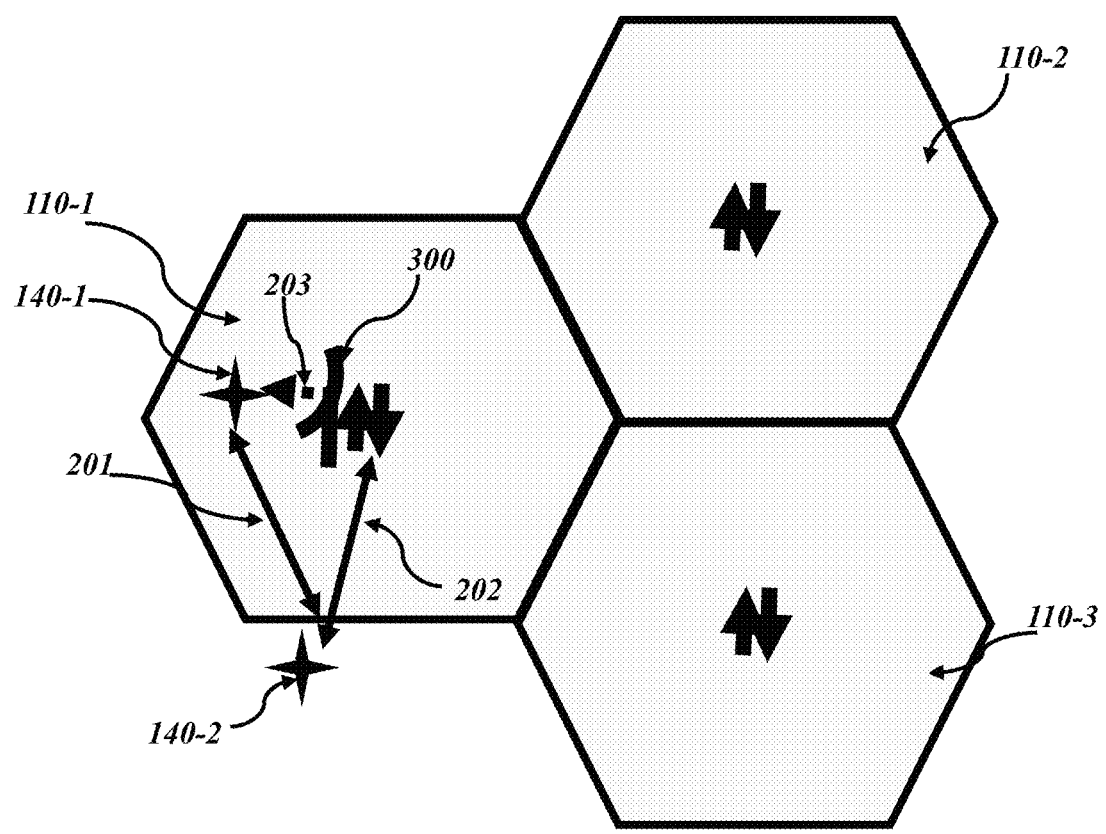

An alternate cell site such as 110-2 of FIG. 8A may not always be available to an aerial platform, or the alternative cell site may be blocked or be also in line with an interferer, or the distance from the aerial platform to the alternative cell site may be very large resulting in low SINR from the aerial platform to the alternate cell site. FIG. 8B illustrates an example where the aerial platform 140 path to cell site 110-1 is being interfered with by interferer 300, and moreover aerial platform 140-1 is too far from the other cell sites 110-2 and 110-3.

Mesh networking among aerial platforms is one technique to mitigate external interference. In the case of FIG. 8B, aerial platform 140-1 establishes link 201 with aerial platform 140-2 and aerial platform 140-2 in turn relays aerial platform 140-1 data to cell site 110-1 via link 202. In the exemplary example of FIG. 4A, the aerial platform has multiple antenna apertures covering different directions. Then, one antenna beam of the aerial platform 140-2 communicates with aerial platform 140-1, while a second beam of the aerial platform 140-2 communicates with cell site 110-1. In the example illustrated by FIG. 4A, each antenna beam has a dedicated radio sub-system to allow simultaneous communications on multiple links to other aerial platforms and to the cell sites. In the case of FIG. 4B where there is a single radio sub-system, shared among multiple antenna apertures/beams, multiple communications links is established between an aerial platform and other aerial platforms or cell sites by time sharing the radio sub-system among the multiple links. In this case, multiple links from the aerial platform are active one at a time. In order to ensure that a given aerial platform radio sub-system be able to detect signals from other close by aerial platforms, each aerial platform periodically transmits a reference signal on each of its antenna apertures/beams covering the azimuth in 360 degrees.

The aerial platform radio sub-system establishes communications with the cell site from which it receives the highest signal quality, and carries out handoff to a different cell site as needed in order to communicate with a cell site from which it receives the highest signal quality. In one embodiment of utilizing mesh networking to enhance the quality of the communications link, if the signal quality received at a first aerial platform radio sub-system from the cell site from which the aerial platform receives the highest signal quality falls below a threshold, the aerial platform radio sub-system searches for reference signals transmitted from other aerial platforms, chooses a second aerial platform from which it receives the highest signal quality from among all aerial platforms from which it detects a signal, and establishes a communications link with the said second aerial platform. In another embodiment of utilizing mesh networking to enhance the quality of the communications link, the first aerial platform radio sub-system searches for reference signals from cell site and aerial platform network entities, measures the signal quality (e.g. SINR) of the detected reference signals, chooses the network entity from which it receives the highest signal quality, and establishes a communications link with the chosen cell site or aerial platform network entity. The aerial platform radio sub-system, while associated with a cell site or another aerial platform, continues to search for signals from network entities, and once it finds a network entity from which it receives a higher signal quality, the aerial platform initiates a handoff to the said network entity.

Link Improvement near Cell Site

The cell site antenna panels that are deployed to cover large distances from the cell site, i.e. a few degrees above horizon, have low gain at high elevation angles from the cell site. Then, as the aerial platform flies very close to a cell site, the elevation angle toward the aerial platform will be high and the cell site antenna gain may be too low toward the aerial platform to establish a link with the cell site. Another issue that arises as the aerial platform approaches a cell site is that the multiple beams being transmitted by the cell site in different directions may cause cross-beam interference to one another at areas close to the cell site. One solution to increasing the cell site antenna gain toward high elevation angles is to add additional antennas at the cell site that would be tilted up to provide high gain toward higher elevation angles and above the cell site. In another embodiment, the aerial platform antenna sub-system is designed to also have an additional antenna aperture that covers high angles below horizon when the aerial platform is close to a cell site. In one embodiment, the additional aerial platform antenna aperture would be placed under the antenna sub-system 142. Then, as the aerial platform approaches a cell site, the cell site antennas that cover high elevation angles or the aerial platform antenna aperture that covers high angles below horizon will be used to establish communications between the aerial platform and the cell site.

In another embodiment for providing connectivity to the aerial platform at high elevation angles from a first cell site, the aerial platform is handed off to a second more distant cell site as the aerial platform approaches a first cell site. The aerial platform radio sub-system searches for signals from other cell sites using the aerial platform's multiple antenna apertures, and determines if there is an alternative cell site which provides a stronger signal to the aerial platform. Once a cell site with stronger signal quality, such as higher forward link SINR, is found, the aerial platform will be handed off to the said second cell site. Then, as the aerial platform approaches a cell site, the aerial platform will automatically handoff to a more distant cell site with adequate SINR.

As mentioned above, when an aerial platform is close to a cell site and all cell site beams operate on the same frequency channel, there may be cross-beam interference because there are many beams visible to the aerial platform. Moreover, as the aerial platform approaches a cell site, there will be locations when the signal strength from a distant cell site and the signal strength from the nearby cell site with which the aerial platform is communicating is comparable. In this area, referred to as the cell site transition area, the SINR will be close or below 0 dB and not adequate for high data rates. The cell site transition area is a circle around the cell site where the aerial platform will receive a stronger SINR from a distant cell site, and the aerial platform is handed off to the distant second cell site despite aerial platform being much closer to a first cell site.

Figure 7B:
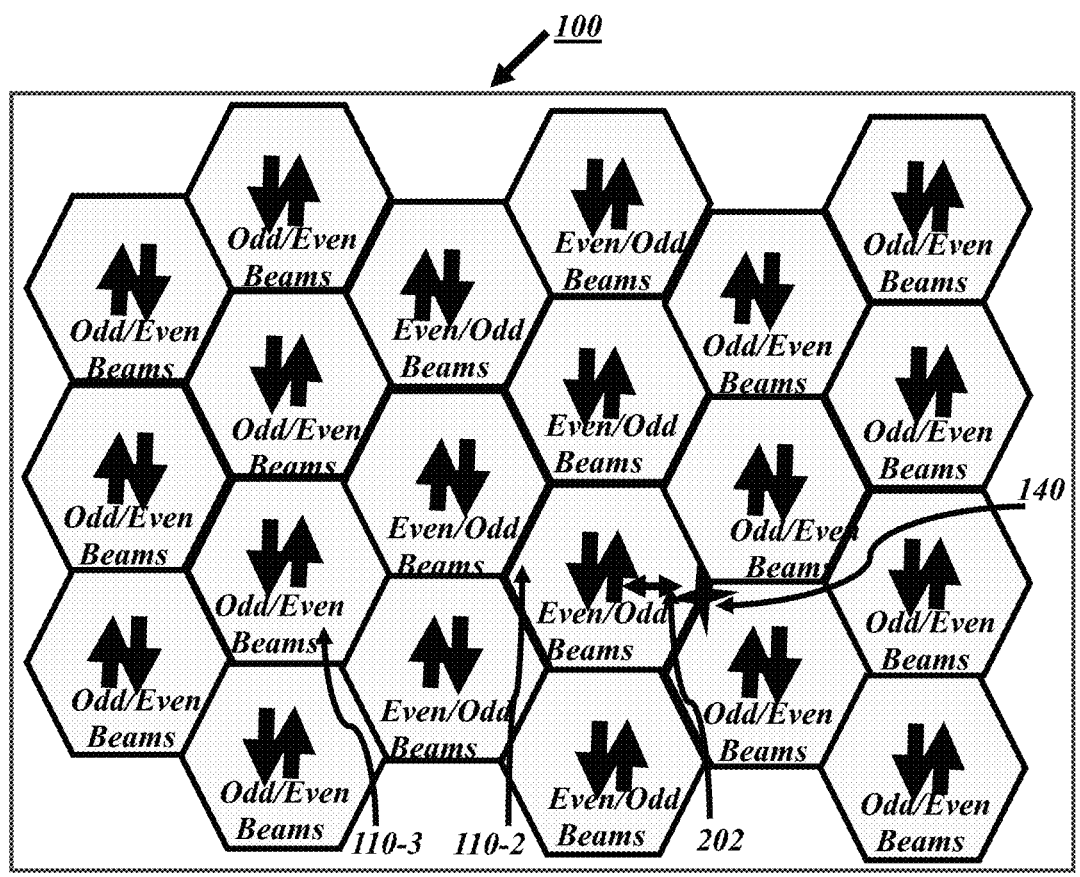

Therefore, a mechanism is needed to increase the SINR seen by the aerial platform when within the transition area of a cell site. One solution would be to have opposite reverse link/forward link duplexing at the two cell sites during different time intervals, as is illustrated in FIG. 6B and its accompanying embodiments. When the two cell sites have opposite duplexing, i.e. one cell site is in reverse link mode and the other in forward link mode, then interference from the cell site with which the aerial platform is not communicating is avoided. Another solution to mitigating interference in the transition region is, as illustrated by FIG. 7B and its accompanying embodiments, to have the neighboring cell site use a different set of beams (odd or even) during a time interval.

In another embodiment for mitigating interference inside the transition area, a set of frequency channels are set aside in the network for use by aerial platforms when they are inside the transition area, referred to as transition frequency channels. In one embodiment, the set of transition frequency channels are further divided into 3 groups and are assigned to the different cell sites according to a frequency reuse of 3 pattern. In other words, each transition frequency channel is only used in $\frac{1}{3}^{rd}$ of the cell sites and no two adjacent cell site uses the same transition frequency channel. The frequency reuse of 3 ensures that there is little interference to an aerial platform from other cell sites when flying over a transition region. In another embodiment, all transition frequency channels may be used at all cell sites but each transition frequency channel is only used in one of the 3 adjacent cells at a given time, referred to as time reuse of 3. In other words, in time reuse of 3, each transition frequency channel is only used on one of the three adjacent cell sites in order to avoid interference from neighboring cell sites to the transition frequency channel being used by an aerial platform. In another embodiment, the set of transition frequencies are divided into two sets, different rows of the network use alternative forward/reverse link duplexing described by FIG. 6B, and the two set of transition frequencies are used in a frequency reuse of 2 pattern between different cells in each row of cells of the network.

There is the question of how the network determines that the aerial platform is inside the transition area, what distant cell site to handoff the aerial platform to, and what frequency channel to use. In one embodiment, the aerial platform radio sub-system uses knowledge of the aerial platform's position coordinates as well as the position coordinates of the cell sites in the network to determine that the aerial platform has entered the transition area. Next the aerial platform based on its position location and its heading, looks up a table of candidate handoff cell site/sector to choose the best cell site to which to handoff. This table has a candidate handoff cell site/sector for each position location and heading of the aerial platform. Once the candidate handoff cell site/sector has been determined, the aerial platform initiates communications with the said cell site/sector using the aerial platform's antenna aperture that provides the highest gain toward the said cell site/sector. In another embodiment, the aerial platform periodically searches the signal strength such as SINR received from different cell sites/sectors and frequency channels, and when a cell site/sector with higher SINR is found, the aerial platform handoffs to the said cell site/sector and the frequency channel, and uses the aerial platform's aperture/beam that provides the highest gain toward the said cell site.

The network of cell sites may communicate with aerial platforms flying at varying altitudes, such low altitude drones flying at altitude of as low as a few hundred feet, or commercial airplanes flying at altitudes of as high as 30000 feet or higher. The antenna of aircraft flying at high altitude will receive signals from many cell sites on the ground besides the cell site with which the aircraft is communicating. Therefore, the high-altitude aircraft such as commercial or general aviation airplanes may receive excessive interference if there are many terrestrial cell sites deployed. In one embodiment for mitigating interference to high altitude aircraft, the network of cell sites on the ground is divided into two networks, a first network communicating with low altitude aircraft and a second network communicating with high altitude aircraft. Since most low altitude drones will fly over or near cities, the cell site of the second network are deployed in areas of the country with low population density and away from cell sites of the first network. Then, since the aircraft directional antenna points its beam toward the cell sites in the second network, it will receive low interference due to low density of cell sites of the first network in the areas where cell sites of the second network are deployed. In other words, the cell sites of the first network and the second network are geographically separated where the geographic distance depends on the beamwidth of the aircraft antennas as described next. The interference received by the aircraft antenna depends on the beamwidth of its antenna beam. In one embodiment, the distance between the cell sites of the two networks is determined such that the interference received by the aircraft from cell sites of the first network is attenuated by x dB relative to the signal received from the cell site of the second network with which the aircraft is communicating. Let D denote the highest distance at which an aircraft may communicate with the cell site of the second network, and xdB-BW be the beamwidth of the aircraft antenna at which the gain of the aircraft antenna rolls off by at least x dB from boresight. The said attenuation will be achieved when the cell sites of the first network are separated from a cell site of the second network by xdB-BW*D.

In TDD (Timed Division Duplexing) systems, the forward link and reverse link of the cell sites use the same frequency channel but in different time slots. In another embodiment for mitigating interference to aircraft flying at high altitudes in a TDD system, when aircraft communicating with the second network are receiving during a time slot, the cell sites of the first network are also receiving during the same time slot from the aerial platforms with which they are communicating. In other words, cell sites of the first and second network do no simultaneously transmit on the same time slot. During each time slot, cell sites of one network is transmitting and cell sites of the other network are receiving. Then, the receiver of an aircraft receiving from a cell site of the second network does not receive any interference from cell sites of a first network. In FDD (Frequency Division Duplexing) systems where the forward link and reverse link use different frequency channels, the frequency channels used for forward link direction by cell sites of the first network are used for reverse link by cell sites of the second network and vice versa. Then, an aircraft receiving from a cell site of the second network does not receive interference from cell sites of the first network. Note that the cell sites of the first and second network need to be synchronized at time slot boundary in order to ensure the two networks transmit and receive in such as way as to avoid interference to the aircraft flying at high altitude as describe above.

What is claimed is:

1. A system to provide broadband access to aerial platforms, comprising:
   a network comprised of one or more columns and one or more rows of cell sites, each cell site comprising a cell site radio sub-system and a cell site antenna sub-system configured to form at least one steerable beam;
   a plurality of aerial platforms that each comprise an aerial platform radio sub-system and an aerial platform antenna sub-system comprising at least one aerial platform antenna aperture configured to form at least one steerable beam;
   a cell site controller that communicates with the cell site radio sub-systems, configured to assign a cell site beam, a frequency channel and a time slot to each aerial platform;
   each cell site comprising an even number of sectors, identified as odd and even sectors;
   on a given time slot each cell site only transmits on an even numbered or an odd numbered sector;
   cell sites in a row are alternately identified as odd/even and even/odd;
   in a first time interval, odd/even cell sites transmit/receive on odd beams and even/odd cell sites transmit/receive on even beams, and in a second time interval, odd/even cell sites transmit/receive on even beams and even/odd cell sites transmit/receive on odd beams;
   each cell site transmitting at least one reference signal; and
   the aerial platform radio sub-system capable of measuring a received Signal to Interference plus Noise Ratio (SINR).

2. The system of claim 1, wherein the aerial platform is assigned to communicate with a nearest cell site.

3. The system of claim 1, wherein the areal platform radio sub-system is assigned to communicate with a cell site from which the aerial platform radio sub-system receives a highest measured SINR.

4. The system of claim 3, wherein the aerial platform comprises of at least three antenna apertures, and the aerial platform radio sub-system uses the aerial platform antenna aperture from which it receives the highest measured SINR.

5. The system of claim 1, wherein a cell site antenna sub-system in each sector comprises of at least two antenna apertures, each antenna aperture placed vertically above another antenna aperture.

6. The system of claim 5, wherein the cell site radio sub-system in each sector receives from a cell site antenna aperture on which it measures a highest signal quality.

7. The system of claim 6, wherein the cell site radio sub-system transmits on the cell site antenna aperture on which it receives the highest signal quality.

8. The system of claim 5, wherein:
the cell site radio sub-system transmits a reference signal on each antenna aperture;
the aerial platform radio sub-system measures a signal quality of each reference signal, and determines a reference signal with a highest signal quality; and
the cell site radio sub-system transmits on the antenna aperture from which the aerial platform radio sub-system receives the reference signal with a highest signal quality.

9. System of claim 1, wherein the aerial platform radio sub-system is configured to:
communicate with a first cell site;
measure a first SINR of the reference signal of the first cell site;
measure a second SINR of the reference signal of a second cell site if the first SINR falls below a threshold; and
communicate with the second cell site if the second SINR is higher than the first SINR.

10. The system of claim 1, wherein the aerial platform radio sub-system is configured to:
communicate with a first cell site;
measure a first SINR of the reference signal of the first cell site;
periodically measure a second SINR of the reference signal of a second cell site; and
communicate with the second cell site if the second SINR is higher than the first SINR.

11. The system of claim 1, wherein a mechanical device switches an azimuthal position of the aerial platform antenna aperture among a number of azimuthal positions.

12. The system of claim 1, wherein the aerial platform antenna sub-system comprises of a single antenna aperture and a mechanical device rotates the single antenna aperture toward the cell site with which the aerial platform is communicating.

13. The system of claim 1 wherein an aerial platform in idle state is assigned to communicate with a nearest cell site.

14. A method in a network of cell sites providing broadband access to aerial platforms, the method comprising:
forming beams toward aerial platforms;
forming beams toward cell sites;
configuring at least one cell site sector antenna aperture;
transmitting a reference signal on each cell site sector antenna aperture;
computing a received SINR of each reference signal;
assigning frequency channels and time slots to each aerial platform;
dividing each cell site into an even number of sectors, identified as odd and even sectors;
transmitting only on an even numbered or an odd numbered sector during a time slot;
identifying cell sites in a row alternately as odd/even and even/odd;
in a first time interval transmitting/receiving on odd beams of odd/even cell sites and transmitting/receiving on even beams of even/odd cell sites, and in a second time interval transmitting/receiving on even beams of odd/even cell sites and transmitting/receiving on odd beams of even/odd cell sites; and
cell sites in a row of cell sites alternately transmitting on even or odd numbered sectors.

15. The method of claim 14, further comprising:
receiving a plurality of reference signals on a plurality of aerial platform antenna apertures; and
computing the received SINR of each reference signal on each aerial platform antenna aperture.

16. The method of claim 15, further comprising receiving from an aerial platform antenna aperture with a highest received SINR.

17. The method of claim 16, further comprising assigning an aerial platform to a cell site sector antenna aperture from which a reference signal with a highest received SINR is received.

18. The method of claim 14, further comprising:
configuring at least two cell site sector antenna apertures;
computing the received SINR of the reference signal received from each cell site sector antenna aperture; and
choosing a cell site sector antenna aperture from which a reference signal with a highest received SINR is received.

19. The method of claim 18, further comprising transmitting on the cell site sector antenna aperture.

20. The method of claim 18, further comprising receiving from the cell site sector antenna aperture.

* * * * *